US007488564B2

(12) United States Patent
Tanaka et al.

(10) Patent No.: US 7,488,564 B2
(45) Date of Patent: Feb. 10, 2009

(54) TONER AND METHOD FOR PRODUCING THE SAME, AND IMAGE-FORMING METHOD USING THE SAME

(75) Inventors: Chiaki Tanaka, Shizuoka (JP); Shigeru Emoto, Numazu (JP); Masahide Yamada, Numazu (JP); Naohiro Watanabe, Shizuoka (JP); Masahiro Ohki, Numazu (JP); Akinori Saitoh, Numazu (JP); Ryota Inoue, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 451 days.

(21) Appl. No.: 11/226,357

(22) Filed: Sep. 15, 2005

(65) Prior Publication Data

US 2006/0099529 A1 May 11, 2006

(30) Foreign Application Priority Data

Sep. 17, 2004 (JP) ............................ 2004-272510

(51) Int. Cl.
*G03G 9/08* (2006.01)

(52) U.S. Cl. ............................ 430/137.14; 430/137.15

(58) Field of Classification Search ............ 430/137.14, 430/124.1, 137.15

See application file for complete search history.

(56) References Cited

U.S. PATENT DOCUMENTS

| | | | | |
|---|---|---|---|---|
| 2,297,691 | A | 10/1942 | Carlson | |
| 6,787,280 | B2 * | 9/2004 | Yamashita et al. | 430/111.4 |
| 6,846,604 | B2 | 1/2005 | Emoto et al. | |
| 6,849,369 | B2 | 2/2005 | Yagi et al. | |
| 6,852,462 | B2 | 2/2005 | Emoto et al. | |
| 6,936,390 | B2 | 8/2005 | Nanya et al. | |
| 2004/0053154 | A1 | 3/2004 | Tomita et al. | |
| 2004/0131961 | A1 | 7/2004 | Watanabe et al. | |
| 2004/0146795 | A1 | 7/2004 | Emoto et al. | |
| 2004/0157146 | A1 * | 8/2004 | Tomita et al. | 430/108.9 |
| 2005/0003291 | A1 | 1/2005 | Takada et al. | |
| 2005/0026066 | A1 | 2/2005 | Tanaka et al. | |
| 2005/0031980 | A1 | 2/2005 | Inoue et al. | |

(Continued)

FOREIGN PATENT DOCUMENTS

JP 62-266550 1/1987

(Continued)

OTHER PUBLICATIONS

U.S. Appl. No. 11/520,642, filed Sep. 14, 2006, Chiaki Tanaka, et al.

(Continued)

*Primary Examiner*—John L Goodrow
(74) *Attorney, Agent, or Firm*—Oblon, Spivak, McClelland, Maier & Neustadt, P.C.

(57) ABSTRACT

There are provided a method for producing a toner which includes: emulsifying and dispersing an oil phase in an aqueous phase so as to form oil droplets; and aggregating the oil droplets so as to associate each other, wherein the oil droplets exhibit non-Newtonian viscosity at the time of aggregating, a method for producing a toner which includes: emulsifying and dispersing an oil phase in an aqueous phase so as to form oil droplets; and aggregating the oil droplets so as to associate each other, wherein the oil droplets exhibit non-Newtonian viscosity at the time of aggregating, as well as a toner obtained by such methods.

16 Claims, 8 Drawing Sheets

$$\sqrt{\tau}-\sqrt{\tau_0}=\sqrt{E_{ta}\times D}$$

U.S. PATENT DOCUMENTS

| | | | |
|---|---|---|---|
| 2005/0042534 | A1 | 2/2005 | Tanaka et al. |
| 2005/0164112 | A1 | 7/2005 | Ohki et al. |

FOREIGN PATENT DOCUMENTS

| | | |
|---|---|---|
| JP | 2-51164 | 2/1990 |
| JP | 5-66600 | 3/1993 |
| JP | 8-211655 | 8/1996 |
| JP | 10-20552 | 1/1998 |
| JP | 11-7156 | 1/1999 |
| JP | 2002-351139 | 12/2002 |

OTHER PUBLICATIONS

U.S. Appl. No. 11/519,893, filed Sep. 13, 2006, Ryota Inoue, et al.
U.S. Appl. No. 10/645,804, filed Aug. 22, 2003, Masami Tomita, et al.
U.S. Appl. No. 10/724,260, filed Dec. 1, 2003, Shigeru Emoto, et al.
U.S. Appl. No. 11/513,175, filed Aug. 31, 2006, Ohki, et al.
U.S. Appl. No. 11/685,969, filed Mar. 14, 2007, Uchinokura, et al.
U.S. Appl. No. 11/611,165, filed Dec. 15, 2006, Sugimoto, et al.
U.S. Appl. No. 11/676,883, filed Feb. 20, 2007, Tanaka.
U.S. Appl. No. 11/687,075, filed Mar. 16, 2007, Yamada, et al.
U.S. Appl. No. 11/685,872, filed Mar. 14, 2007, Uchinokura, et al.
U.S. Appl. No. 11/687,372, filed Mar. 16, 2007, Yamada, et al.
U.S. Appl. No. 11/430,171, filed May 9, 2006, Watanabe, et al.
U.S. Appl. No. 11/852,778, filed Sep. 10, 2007, Nagatomo, et al.
U.S. Appl. No. 11/855,806, filed Sep. 14, 2007, Awamura, et al.
U.S. Appl. No. 11/856,379, filed Sep. 17, 2007, Sawada, et al.
U.S. Appl. No. 11/857,791, filed Sep. 19, 2007, Kojima, et al.

* cited by examiner $$\sqrt{\tau}-\sqrt{\tau_0}=\sqrt{E_{ta}\times D}$$

TONER AND METHOD FOR PRODUCING THE SAME, AND IMAGE-FORMING METHOD USING THE SAME

BACKGROUND OF THE INVENTION

1. Field of the Invention

The present invention relates to a toner which is suitably applicable for an electrophotography, a latent electrostatic recording method, a latent electrostatic printing method and the like. The present invention also relates to an efficient method for producing such toner. Moreover, the present invention is directed to a developer, a toner container, a process cartridge, an image-forming apparatus, and an image-forming method, all of which employ the aforementioned toner.

2. Description of the Related Art

An image-formation in accordance with an electrophotography is generally performed by a serious of processes such as forming a latent electrostatic image on a photoconductor, i.e. a latent electrostatic image bearing member, developing the latent electrostatic image with a developer to form a visible image, i.e. a toner image, transferring and fixing the visible image onto a recording medium, e.g. a piece of paper (referred to U.S. Pat. No. 2,297,691). In the meantime, a cleaning is performed on a residual toner that remained on the photoconductor without being transferred on the recording medium by means of a cleaning member such as a blade which is disposed against the surface of the photoconductor.

The conventional developers in use are a one-component developer which is comprised of a magnetic or non-magnetic toner, and a two-component developer which comprises a toner and a carrier. The conventional toner is generally produced by a kneading-pulverizing method which comprises processes of kneading a thermoplastic resin together with a pigment, a releasing agent, e.g. wax, and a charge controlling agent, pulverizing the mixture, and classifying the pulverized powder. To the surface of the toner, if necessary, inorganic and/or organic fine particles are added for improving flowability or cleaning ability.

However, it has been known that the toner obtained by the kneading-pulverizing method has drawbacks such as a wide particle size distribution, uneven static-charge ability, and occurrence of fogging. In addition, such toner rarely realizes a small particle size such as a volume average particle size of 2 μm, to 8 μm, due to a balance with production efficiency, and hence cannot satisfy the demands for high quality image formation.

Therefore, attention has been drawn to a toner granulized in an aqueous phase, which has a narrow particle size distribution, easily realizes a small granulation, attains images of high quality and high dissolution, and has offset resistance resulted from high dispersion of a releasing agent and excellent low-temperature fixing properties. Such toner also has excellent transferring properties due to uniform charging, and excellent flowability so that a downsizing of a hopper specification and a torque for rotating a developing roller can be realized. Accordingly, it is advantageous in terms of designing a developing device.

As a toner granulized in an aqueous phase, researches and developments have been conducted on a toner obtained by a polymerization method or emulsification dispersion method (this toner is referred to "chemical toner" hereinafter).

Various methods have been known as the polymerization method, but a suspension-polymerization method has been widely known and applied. In the suspension-polymerization method, a monomer, a polymerization initiator, a colorant, and a charge controlling agent are added to an aqueous phase containing a dispersion stabilizer, the mixture is stirred to form oil droplets, and thereafter a polymerization reaction is induced while increasing the temperature, to thereby yield toner particles. There is also proposed an aggregation method in which fine particles are formed by an emulsification-polymerization or suspension-polymerization, the fine particles are aggregated, and the aggregated particles are fused to thereby yield toner particles.

Although the toner obtained by the aforementioned polymerization method or aggregation method has an advantage of a reduced particle, there are drawbacks such that a main component of a binder resin is limited to a vinyl polymer capable of radical polymerization, and thus a polyester resin or epoxy resin suitable for a color toner cannot be used. Moreover, the polymerization method has also problems such that it is difficult to reduce an amount of a volatile organic compound consisting of remained monomer without being reacted and the like, and it is difficult to obtain a narrow particle size distribution.

The emulsification-dispersion method is a method in which a mixture of a binder resin, a colorant and the like is mixed with an aqueous phase, and the mixed aqueous solution is emulsified to thereby yield toner particles (referred to Japanese Patent Application Laid-Open (JP-A) No. 05-66600, and JP-A No. 08-211655). Similar to the polymerization method, the emulsification-dispersion method has advantages such that the size reduction or circularization of toner particles can be easily achieved. In addition, the emulsification-dispersion method has advantages such that it has wider selection of a material for a binder resin, a residual toner is easily reduced, and a concentration of a colorant or the like is arbitrary controlled from low concentration to high concentration.

The binder resin for used in this method is preferably selected from resins which has a relatively low-fixing temperature and melts sharply at the time of fixing to thereby form a smooth image surface. For example, the binder resin is preferably a polyester resin rather than a styrene-acryl resin. In the case that the toner is a color toner, the binder resin is preferably a polyester resin which has excellent flexibility. The recent trend is therefore a production of a toner having small particle size by the emulsification-dispersion method using a polyester resin as a binder resin, which cannot be used in the aforementioned polymerization method.

However, the toner produced by the emulsification-dispersion method also has drawbacks such that the fixing temperature cannot be sufficiently lowered, and a margin of the temperature in which offset does not occur cannot be sufficiently widen. In addition, in a process of the emulsification-dispersion method, it is necessary to form fine particles, the toner yield is lowered due to emulsification-loss, and thus productivity is not sufficient.

To overcome the aforementioned drawbacks, there is proposed a toner production method in which a binder resin, e.g. a polyester resin, is emulsified and/or dispersed to obtain fine particles, the fine particles are aggregated and furthermore fused to form toner particles (referred to JP-A No. 10-020552, and JP-A No. 11-007156). According to this proposed production method, emulsification-loss does not occur since excessively fine particles are not formed, and a toner having a sharp particle size distribution without needs of classification can be attained. However, both of low-temperature fixing properties and offset resistance at high temperature cannot be realized since the polyester resin applicable for this method is mainly a polyester resin having a straight chain or a polyester resin having low viscosity. Especially, the toner obtained by this method lacks applicability for heating-roller fixing of oil-less fixing system for which has recently had a strong demand.

Moreover, these chemical toners are liable to have spherical particle shape due to a surface tension of droplets generated in a process of dispersion. Such spherical toners has good flowability in spite of small particle size, and thus it is advantageous for designing a developing device, for example, a specification of hopper or a torque which rotates a developing roller can be reduced. On the other hand, there is a problem that cleaning is not sufficiently performed on such toner in some of cleaning systems. Generally, cleaning is performed on a surface of a photoconductor after transferring toner image by means of a member such as a blade, a fur brush, or a magnetic brush. Among the conventional cleaning systems, a blade cleaning system has been widely applied since the systematic structure is simple, and an excellent cleaning ability can be expected. In the blade cleaning system, the aforementioned spherical toner rolls and goes into a space between the cleaning blade and the photoconductor, and thus the spherical toner is not sufficiently removed to clean the photoconductor.

To apply a chemical toner to the blade cleaning system, therefore, there is proposed a method in which high-speed stirring is performed before completing a polymerization, the polymerized particles are subjected to mechanical impacts to thereby make the polymerized particles in indeterminate shapes (referred to JP-A No. 62-266550). However, this method is not practical since aggregations between the particles are accelerated to eventually form large polymerized particles due to a destruction of stable dispersed condition, and thus it is difficult to control stirring.

There is also proposed a method in which particles are dispersed with assistance of polyvinyl alcohol having a certain saponification value as a dispersant to thereby form aggregated particles having a diameter of 5 μm to 25 μm for the purpose of improving cleaning ability (JP-A No. 02-51164). However, the aggregated particles in this method are liable to have a large particle diameter, and thus this method is not suitable for manufacturing of a small size toner.

There is also proposed a method of forming deformed particles in which after a phase-inversion emulsification is performed, an organic solvent is removed, the removal of the organic solvent is stopped at a half way and then particles are aggregated or fused (JP-A No. 2002-351139). However, this method requires a self-emulsified resin which limits on the materials or acid values, and thus a material for use cannot be freely selected. Moreover, several steps of delicate adjustment or control are required in the controlling method of particle shapes in which a removal of an organic solvent is stopped at halfway. Therefore, the cost for this method is increased in terms of equipments or productivity, and such method is not suitable for realistic manufacturing.

Accordingly, it is a current situation that there has been demanded, but not yet been provided, a stable and efficient method for producing a toner, without being affected by materials or components for use, which has a small particle size and a narrow particle size distribution, maintains an advantage of a chemical toner such as an excellent flowability, has an excellent cleaning ability (for example, free from cleaning failures due to a cleaning blade), and is deformed to attain high quality image.

It is therefore an object of the present invention is to provide an efficient method for producing a toner which has excellent cleaning ability, attains high quality images, and is reduced in its size and deformed. It is another object of the present invention is to provide an image-forming method using the toner formed by the method of the present invention. It is another object of the present invention is to provide an efficient method for producing particles.

SUMMARY OF THE INVENTION

The inventors of the present invention has diligently studied to accomplish the aforementioned objects and found that a deformed toner can be obtained by controlling a viscosity of droplets, which formed by emulsifying and/or dispersing an oil phase in an aqueous phase, to non-Newtonian viscosity, without being affected by materials or components of a toner to be formed.

Specifically, it has been found that an oil phase is emulsified and/or dispersed in an aqueous phase so as to form oil droplets, the droplets are aggregated so as to generate association between the aggregated oil droplets, the droplets at the time of being aggregated is controlled so as to exhibit non-Newtonian viscosity, and as a result, there is yielded a toner which has an excellent cleaning ability, attains high quality images, has a small particle size, and is suitably deformed. It has been also found that an oil phase containing an organic solvent is emulsified and/or dispersed in an aqueous phase so as to form oil droplets, the organic solvent was removed from the oil droplets, the droplets at the time of removing the organic solvent is controlled so as to exhibit non-Newtonian viscosity, and as a result, there is yielded a toner which has an excellent cleaning ability, attains high quality images, has a small particle size, and is suitably deformed.

The first method for producing a toner of the present invention comprises: emulsifying and dispersing an oil phase in an aqueous phase so as to form oil droplets; and aggregating the oil droplets so as to associate each other, wherein the oil droplets exhibit non-Newtonian viscosity at the time of aggregating. In course of the first method of the present invention, the oil phase is emulsified and/or dispersed in the aqueous medium and the oil droplets are formed. The oil droplets are aggregated, and the aggregated oil droplets are then associated. At the time of aggregating, the oil droplets exhibit non-Newtonian viscosity. Therefore, a flow does not occur inside each of the oil droplets even when the oil droplets are aggregated to each other at the time of aggregating, and thus suitably deformed particles are formed. As a result, there can be efficiently produced a toner having an excellent cleaning ability, attaining high quality images, having small particle size, and being suitably deformed.

The second method for producing a toner of the present invention comprises: emulsifying and dispersing an oil phase containing an organic solvent in an aqueous phase so as to form oil droplets; and removing the organic solvent from the oil droplets, wherein the oil droplets exhibit non-Newtonian viscosity at the time of removing the organic solvent. In course of the second method of the present invention, the oil phase containing the organic solvent is emulsified and/or dispersed in the aqueous medium and the oil droplets are formed. The organic solvent is removed from the oil droplets. At the time of removing the organic solvent, the oil droplets exhibit non-Newtonian viscosity. Therefore, a flow does not occur inside each of the oil droplets, the surface area contraction of each of the oil droplets cannot follow the volume contraction thereof, and thus suitably deformed particles are formed. As a result, there can be efficiently produced a toner having an excellent cleaning ability, attaining high quality images, having small particle size, and being suitably deformed.

In the first or second method for producing a toner of the present invention, the oil phase is prepared by dissolving and/or dispersing, in an organic solvent, a toner material which comprises an active hydrogen group-containing compound and a polymer capable of reacting with an active hydrogen-group containing compound, the oil phase is emulsified and/or dispersed in the aqueous phase, and the active hydrogen group-containing compound and the polymer are allowed to react in the aqueous phase to thereby form particles each of which comprises an adhesive material. As a result, there can be efficiently produced a toner which excels in various properties, such as aggregation resistance, charging properties, flowability, a releasing ability, fixing properties and the like, especially heat-temperature fixing properties and high quality images, in addition to the aforementioned excellent properties.

Moreover, the preferable embodiments of the present invention are as follow: an embodiment in which the oil phase comprises an organic solvent, and the method further comprises removing the organic solvent from the oil droplets after aggregating, wherein the oil droplets exhibit non-Newtonian viscosity at the time of removing the organic solvent; an embodiment in which the non-Newtonian viscosity exhibits structural viscosity; an embodiment in which the structural viscosity is thixotropy; an embodiment in which the oil droplets at the time of aggregating or removing the organic solvent has Casson yield value of 0.5 Pa to 10,000 Pa at 25° C.; and the like.

The toner produced by the method of the present invention has small particle size, is suitably deformed, has an excellent cleaning ability, and attains high quality images. When the toner comprises toner particles comprising an adhesive base material which is formed by reacting the active hydrogen group-containing compound with the polymer capable of reacting with an active hydrogen group-containing compound, the toner has various excellent properties, such as aggregation resistance, charging properties, flowability, a releasing ability, fixing properties and the like. When an image formation is performed by using the toner of the present invention, high quality images can be obtained at the condition of low-temperature fixing.

Moreover, the preferable embodiments of the present invention are as follow: an embodiment in which the toner (toner particles) has an average circularity of 0.900 to 0.980; an embodiment in which the toner (toner particles) has a volume average particle diameter of 3 μm to 8 μm; an embodiment in which a ratio of the volume average particle diameter (Dv) to a number average particle diameter (Dn) of the toner is 1.05 to 1.25; and the like.

The toner of the present invention can be contained in a developer. When image formation is performed by using such developer, there can be formed high quality images with high image density and high resolution.

The aforementioned toner can be commercialized as a toner container in which the aforementioned toner is loaded. When image formation is performed by using the aforementioned toner loaded in the toner container, there can be formed high quality images with high image density and high resolution.

The aforementioned toner can be loaded in a process cartridge. Such process cartridge comprises a latent electrostatic image bearing member and a developing unit which develop a latent electrostatic image formed on the latent electrostatic image bearing member with the aforementioned toner so as to form a visible image. This process cartridge is detachable to an image-forming apparatus and excels in easy handling or convenience. Since the process cartridge comprises the aforementioned toner, the process cartridge is capable of forming high quality images with high image density and high resolution.

The aforementioned toner can be loaded in an image-forming apparatus. Such image-forming apparatus comprises a latent electrostatic image bearing member, a latent electrostatic image forming unit which configured to form a latent electrostatic image on the latent electrostatic image bearing member, a developing unit which is configured to develop the latent electrostatic image with the aforementioned toner so as to form a visible image, a transferring unit which is configured to transfer the visible image to a recording medium, and a fixing unit which is configured to fix the transferred image onto the recording medium. In course of image formation by means of the image-forming apparatus, the latent electrostatic image is developed with the toner of the present invention by the developing unit, the visible image is transferred to a recording medium by the transferring unit, and the transferred image is fixed onto the recording medium by the fixing unit. As a result, there are formed high quality images with high image density and high resolution.

The image-forming method of the present invention comprising: forming a latent electrostatic image on a latent electrostatic image bearing member; developing the latent electrostatic image bearing member with the aforementioned toner; transferring the visible image to a recording medium; and fixing the transferred image onto the recording medium. In cause of the image-forming method of the present invention, a latent electrostatic image is formed on a latent electrostatic image bearing member, the latent electrostatic image is developed with the aforementioned toner to thereby form a visible image, the visible image is transferred to a recording medium, and the transferred image is fixed onto the recording medium. As a result, a high quality image with high image density and high resolution is formed.

The first method for producing particles of the present invention comprises: emulsifying and dispersing an oil phase in an aqueous phase so as to form oil droplets; and aggregating the oil droplets so as to associate each other, wherein the oil droplets exhibit non-Newtonian viscosity at the time of aggregating. In course of the first method of the present invention, the oil phase is emulsified and/or dispersed in the aqueous medium and the oil droplets are formed. The oil droplets are aggregated, and the aggregated oil droplets are then associated. At the time of aggregating, the oil droplets exhibit non-Newtonian viscosity. Therefore, a flow does not occur inside each of the oil droplets even when the oil droplets are aggregated to each other at the time of aggregating, and thus suitably deformed particles are efficiently produced.

The second method for producing a toner of the present invention comprises: emulsifying and dispersing an oil phase containing an organic solvent in an aqueous phase so as to form oil droplets; and removing the organic solvent from the oil droplets, wherein the oil droplets exhibit non-Newtonian viscosity at the time of removing the organic solvent. In course of the second method of the present invention, the oil phase containing the organic solvent is emulsified and/or dispersed in the aqueous medium and the oil droplets are formed. The organic solvent is removed from the oil droplets. At the time of removing the organic solvent, the oil droplets exhibit non-Newtonian viscosity. Therefore, a flow does not occur inside each of the oil droplets, the surface area contraction of each of the oil droplets cannot follow the volume contraction thereof, and thus suitably deformed particles are efficiently produced.

Moreover, the preferable embodiments of the present invention are as follow: an embodiment in which the oil phase comprises an organic solvent, and the method further comprises removing the organic solvent from the oil droplets after aggregating, wherein the oil droplets exhibit non-Newtonian viscosity at the time of removing the organic solvent; an embodiment in which the non-Newtonian viscosity exhibits structural viscosity; an embodiment in which the structural viscosity is thixotropy; an embodiment in which the oil droplets at the time of aggregating or removing the organic solvent has Casson yield value of 0.5 Pa to 10,000 Pa at 25° C.; and the like.

The particles produced by the method of the present invention preferably has an average circularity of 0.900 to 0.980, a volume average particle diameter of 3 μm to 8 μm, and a ratio of the volume average particle diameter (Dv) to a number average particle diameter (Dn) to be 1.05 to 1.25.

Figure 1:
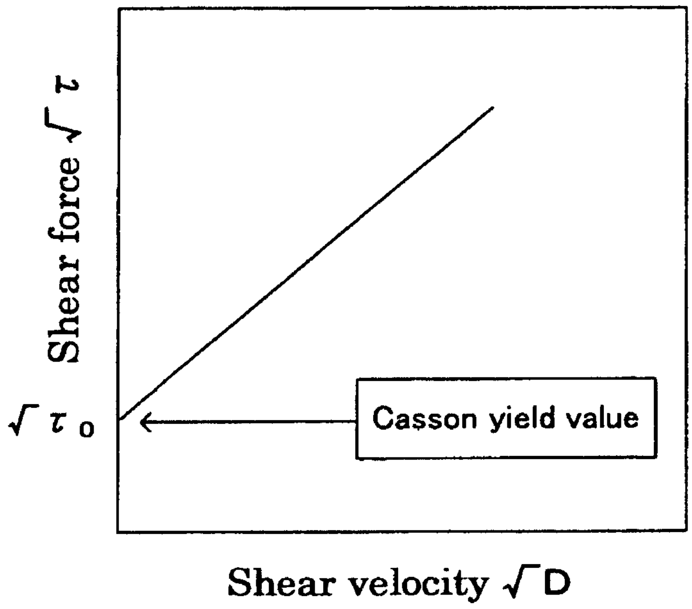
FIG. 1 is a graph showing an example of Casson yield value.

DESCRIPTION OF THE PREFERRED EMBODIMENTS (Particles and Method for Producing the Same, and Toner and Method for Producing the Same)

The first embodiment of the method for producing particles of the present invention comprises emulsifying and/or dispersing an oil phase in an aqueous phase so as to form oil droplets, and aggregating the oil droplets so as to associate each other, wherein the oil droplets exhibit non-Newtonian viscosity at the time of aggregating.

The second embodiment of the method for producing particles of the present invention comprises emulsifying and/or dispersing an oil phase containing an organic solvent in an aqueous phase so as to form oil droplets, and removing the organic solvent from the oil droplets, wherein the oil droplets exhibit non-Newtonian viscosity at the time of removing the organic solvent.

The particles of the present invention are produced by the method of the present invention.

The first embodiment of the method for producing a toner of the present invention comprises emulsifying and/or dispersing an oil phase in an aqueous phase so as to form oil droplets, and aggregating the oil droplets so as to associate each other, wherein the oil droplets exhibit non-Newtonian viscosity at the time of aggregating.

The second embodiment of the method for producing a toner of the present invention comprises emulsifying and/or dispersing an oil phase containing an organic solvent in an aqueous phase so as to form oil droplets, and removing the organic solvent from the oil droplets, wherein the oil droplets exhibit non-Newtonian viscosity at the time of removing the organic solvent.

The toner is produced by the method of the present invention.

The toner is preferably produced by dissolving and/or dispersing an active hydrogen group-containing compound and a polymer capable of reacting with an active hydrogen group-containing compound in an organic solvent so as to form an oil phase, emulsifying and/or dispersing the oil phase in an aqueous phase, and allowing the active hydrogen group-containing compound and the polymer to react in the aqueous phase so as to generate an adhesive base material in the shape of particles.

The toner is explained in descriptions of the method for producing a toner of the present invention hereinafter.

The method for producing particles is preferably the method of producing a toner of the present invention, and the particles are preferably the toner produced by the method of the present invention.

Accordingly, the particles and method for producing particles of the present invention are explained in descriptions of the toner and method for producing a toner of the present invention hereinafter.

The oil droplets have either Newtonian viscosity or non-Newtonian viscosity.

A fluid having Newtonian viscosity, i.e. Newtonian fluid, obeys Newton's law of viscosity. Specifically, in Newtonian fluid, the shear stress is proportional to the shear velocity. If the shear velocity is gradually increased from 0, for example, the shear stress is also increased from 0 proportional to the increasing rate of the shear velocity. In Newtonian fluid, moreover, the viscosity is constant, if the temperature is maintained constant.

On the other hand, a fluid having non-Newtonian viscosity, i.e. non-Newtonian fluid, does not obey Newton's law of viscosity, and the apparent viscosity changes according to a change of the shear stress or shear velocity.

In this specification, "Newtonian viscosity" includes a condition which is close to Newtonian viscosity and may have a structural viscosity, but the structural viscosity is weak. An example of such condition is an embodiment having Casson yield value of less than 0.5 Pa, which will be explained hereinafter.

Examples of the non-Newtonian viscosity are structural viscosity, dilatancy, and the like.

The structural viscosity is a phenomenon such that the apparent viscosity decreases as the shear stress increases. Contrary to this, the dilatancy is a phenomenon such that the viscosity increases as the shear stress increases.

The general mechanism of the structural viscosity is explained in various publications, such as Shigeharu Onoki, 'Rheology for Chemist' Kagaku-dojin Publishing Company, Inc, p. 37.

Examples of the structural viscosity are thixotropy, rheopexy, and the like.

The thixotropy is a phenomenon such that the shear velocity depends on the shear force or the time for applying the shear force. Namely, the thixotropic liquid decreases its viscosity and flows when the shear force is applied, but recovers the original viscosity after being left to stand for a while.

Contrary to the thixotropy, the rheopexy is a phenomenon such that the viscosity increases when the liquid is flowed at certain shearing velocity.

The Newtonian viscosity and the non-Newtonian viscosity are interchangeable by a viscosity transforming treatment. The viscosity transforming treatment is a treatment for transforming a viscosity of the oil droplets.

As the viscosity transforming treatment, there are a treatment which transforms viscosity of the oil droplets from non-Newtonian viscosity to Newtonian viscosity, and a treatment which transforms viscosity of the oil droplets from Newtonian viscosity to non-Newtonian viscosity.

In the present invention, the viscosity transforming treatment is not necessary since the oil droplets exhibit non-Newtonian viscosity at the time of aggregating or removing the organic solvent. However, it is essential that, in the first embodiment of the method for producing a toner, the viscosity of the oil droplets become non-Newtonian viscosity after preparing the oil phase but until at the time of aggregating at latest. In the second embodiment of the method for producing a toner, the viscosity of the oil droplets essentially become non-Newtonian viscosity after preparing the oil phase but until at the time of removing the organic solvent at latest. In the case that the viscosity of the oil droplets changed from non-Newtonian viscosity to Newtonian viscosity after aggregating, the viscosity of the oil droplets can be transformed back to non-Newtonian viscosity by the viscosity transforming treatment before the removal of the organic solvent is performed.

Note that, the viscosity transforming treatment can be performed at the time of aggregating or removing the solvent.

The viscosity transforming treatment may be performed once or number of times.

The viscosity transforming treatment which transforms the viscosity of the oil droplets from non-Newtonian viscosity to Newtonian viscosity is not particularly limited and can be appropriately selected in accordance with a purpose. Examples of such viscosity transforming treatment are a stirring treatment, an oscillation treatment, and the like.

The viscosity transforming treatment which transforms the viscosity of the oil droplets from Newtonian viscosity to non-Newtonian viscosity is not particularly limited and can be appropriately selected in accordance with a purpose. Examples of such viscosity transforming treatment are an addition of a deforming agent, e.g. a viscosity controlling agent, and thixotropy imparting agent, and the like. The viscosity transforming treatment which transforms the viscosity of the oil droplets from Newtonian viscosity to non-Newtonian viscosity also includes such method that the structural viscosity of the oil droplets exhibiting non-Newtonian viscosity is destroyed by the stirring treatment and temporarily recovers Newtonian viscosity, and then recovers the temporarily lost structural viscosity by leaving the oil droplets to stand.

-Oil Phase-

The oil phase comprises, for example, at least one of monomer, polymer, an active hydrogen group-containing compound, and a polymer capable of reacting with an active hydrogen group-containing compound. The oil phase optionally further comprises a toner material containing other components such as a colorant, a releasing agent, a charge controlling agent, and the like. Preferably, the oil phase comprises an organic solvent together with the toner material, and is formed by dissolving and/or dispersing the toner material in the organic solvent.

The organic solvent is not particularly limited, and can be appropriately selected in accordance with a purpose, provided that the organic solvent allows the toner material to be dissolved and/or dispersed therein. It is preferable that the organic solvent is a volatile organic solvent having a boiling point of less than 150° C. in view of easy removal thereof. Suitable examples thereof are toluene, xylene, benzene, carbon tetrachloride, methylene chloride, 1,2-dichloroethane, 1,1,2-trichloroethane, trichloroethylene, chloroform, monochlorobenzene, dichloroethylidene, methylacetate, ethylacetate, methyl ethyl ketone, methyl isobutyl ketone, and the like. Among these organic solvents, toluene, xylene, benzene, methylene chloride, 1,2-dichloroethane, chloroform, carbon tetrachloride are preferable, and methyl acetate is more preferable. These solvents can be selected singly or in combination. The usage amount of the organic solvent is preferable from 40 to 300 parts by mass, more preferably from 60 to 140 parts by mass, and furthermore preferably from 80 to 120 parts by mass with respect to 100 parts by mass of the toner material.

--Active Hydrogen Group-containing Compound--

The active hydrogen group-containing compound functions as an elongation initiator or crosslinking agent at the time of elongation reactions or crosslinking reactions of the active hydrogen group-containing compound and the polymer capable of reacting with the active hydrogen group-containing compound in an aqueous medium.

The active hydrogen group-containing compound is not particularly limited, provided that it contains an active hydrogen group, and can be appropriately selected in accordance with a purpose. In the case that the polymer capable of reacting with the active hydrogen group-containing compound is (A) a polyester prepolymer containing an isocyanate group, the active hydrogen group-containing compound is preferably selected from (B) amines in view of capability of high molecular mass polymerization resulted from elongation reaction, crosslinking reaction, and the like.

In the active hydrogen group-containing compound, the active hydrogen group is not particularly limited, and can be appropriately selected in accordance with a purpose. Examples of the active hydrogen group are hydroxyl groups such as an alcoholic hydroxyl group, a phenolic hydroxyl group, and the like, carboxyl groups, mercapto groups, and the like, which can be used singly, or in combination of two or more thereof. Of these, the alcoholic hydroxyl group is particularly preferable.

The (B) amines are not particularly limited, and can be appropriately selected in accordance with a purpose. Examples of (B) amines are (B1) a divalent amine compound, (B2) a trivalent or more polyvalent amine compound, (B3) an aminoalcohol, (B4) an amino mercaptan, (B5) an amino acid, and (B6) a compound in which the amino group of B1 to B5 is blocked. Theses can be used singly, or in combination of two or more. Of these amines, the (B1) divalent amine compound, and a mixture of (B1) divalent amine compound and (B2) trivalent or more polyvalent amine compound are particularly preferable.

Examples of the (B1) divalent amine compound are: an aromatic diamine such as phenylene diamine, diethyl toluene diamine, 4,4'-diamino diphenyl methane; an alicyclic diamine such as 4,4'-diamino-3,3'-dimethyl dicyclohexyl methane, diamine cyclohexane, and isophorone diamine; and an aliphatic diamine such as ethylene diamine, tetramethylene diamine, and hexamethylene diamine.

Examples of the (B2) trivalent or more polyvalent amine compound are diethylene triamine, triethylene tetramine, and the like.

Examples of the (B3) aminoalcohol are ethanol amine, hydroxyethylaniline, and the like.

Examples of the (B4) amino mercaptan are aminoethyl mercaptan, aminopropyl mercaptan, and the like.

Examples of the (B5) amino acid are aminopropionic acid, aminocaproic acid, and the like.

Examples of the (B6) compound in which the amino group of B1 to B5 is blocked are: a ketimine compound obtained from the above-noted amines of B1 to B5 and ketones such as acetone, methyl ethyl ketone, and methyl isobuthyl ketone; oxazolidine compound; and the like.

In order to stop cross-linking and/or elongation reactions of the active hydrogen group-containing compound and the polymer capable of reacting with the active hydrogen group-containing compound, a reaction stopper may be used as required to control the molecular mass of the adhesive base material to be obtained. Examples of the reaction stopper are: a monoamine such as diethyl amine, dibutyl amine, butyl amine, and lauryl amine; a compound in which the above-noted elements are blocked such as a ketimine compound; and the like.

A mixing ratio of (B) amines and (A) a polyester prepolymer having isocyanate group, defined as an equivalent ratio [NCO]/[NHx] of isocyanate group [NCO] in (A) a polyester prepolymer having isocyanate group to amine group [NHx] in (B) amines, is 1/3 to 3/1preferably 1/2 to 2/1.and more preferably 1/1.5 to 1.5/1. When [NCO]/[NHx] is less than 1/3, the low-temperature fixing properties are degraded. When [NCO]/[NHx] is more than 3/1, on the other hand, the molecular mass of the urea-modified polyester becomes low, thereby degrading hot-offset resistance.

--Polymer Capable of Reacting with Active Hydrogen Group-Containing Compound--

The polymer capable of reacting with the active hydrogen group-containing compound, which may be simply referred to "a prepolymer", is not particularly limited, provided that it has a moiety capable of reacting with the active hydrogen group-containing compound, and can be appropriately selected in accordance with a purpose. Examples of the prepolymer are a polygon resin, a polyacrylic resin, a polyester resin, an epoxy resin, a modified resin thereof, and the like. Theses can be selected singly, or in combination of two or more. Of these examples, the polyester resin is particularly preferable in view of high flowability at the time of melting, and transparency.

The moiety capable of reacting with the active hydrogen group-containing compound is not particularly limited, and can be appropriately selected from the known substituents. Examples of such moiety are an isocyanate group, an epoxy group, a carboxyl group, an acid chloride group, and the like. These may be selected singly or in combination of two or more. Of these examples, the isocyanate group is particularly preferable.

The prepolymer is particularly preferably a polyester resin containing a group capable of generating urea bonding (RMPE) in view of controllability of the molecular mass of high molecular substance, oil-less and low-temperature fixing properties of a dry toner, especially suitable releasing and fixing properties without a releasing oil applicator for a heating member for fixing.

Examples of the group capable of generating urea bonding are isocyanate group, and the like. In the case that the group capable of generating urea bonding in the polyester resin (RMPE) is the isocyanate group, the polyester resin (RMPE) is particularly preferably (A) a polyester prepolymer having an isocyanate group.

The (A) polyester prepolymer having an isocyanate group is not particularly limited, and can be selected in accordance with a purpose. Examples of the (A) polyester prepolymer having an isocyanate group are a polycondensation polyester of polyol (PO) and a polycarboxylic acid (PC), a reactant of the active hydrogen group-containing group and polyisocyanate (PIC), and the like.

The polyol (PO) is not particularly limited, and can be appropriately selected in accordance with a purpose.

Examples of the polyol (PO) are diol (DIO), trivalent or more polyhydric alcohol (TO), and a mixture of diol (DIO) and trivalent or more polyhydric alcohol (TO), and the like. These can be selected singly, or in combination of two or more. Of these examples, the diol (DIO) per se, or a mixture of the diol (DIO) and a little amount of the trivalent polyhydric alcohol (TIO) are preferably.

Examples of the diol (DIO) are alkylene glycol, alkylene ether-glycol, alicyclic diol, alkylene oxide adduct of alicyclic diol, bisphenol, alkylene oxide adduct of bisphenol, and the like.

Examples of the alkylene glycol are alkylene glycol having 2-12 carbon atoms such as ethylene glycol, 1,2-propylene glycol, 1,3-propylene glycol, bytane-1,4-diol, hexane-1,6-diol and the like.

Examples of the alkylene ether glycol are diethylene glycol, triethylene glycol, dipropylene glycol, polyethylene glycol, polypropylene glycol, polytetramethylene ether glycol, and the like.

Examples of the alicyclic diol are cyclohexane-1,4-dimethanol, hydrogenated bisphenol A, and the like.

Examples of the alkylene oxide adduct of alicyclic diol are alicyclic diol selected from the above-listed alicyclic diols, adducted with alkylene oxide such as ethylene oxide, propylene oxide, butylene oxide, and the like.

Examples of the bisphenol are bisphenol A, bisphenol F, bisphenol S, and the like.

Examples of the alkylene oxide adduct of bisphenol are bisphenol selected from the above-listed bisphenols adducted with alkylene oxide such as ethylene oxide, propylene oxide, butylene oxide, and the like.

Of these examples, alkylene glycol having 2-12 carbon atoms, and alkylene oxide adduct of bisphenol are preferable, and alkylene oxide adduct of bisphenol, and a mixture of alkylene oxide adduct of bisphenol and alkylene glycol having 2-12 carbon atoms are particularly preferable.

The trivalent or more polyhydric alcohol (TO) is preferably polyhydric alcohol having a valency of 3 to 8, and/or a valency of 8 or more. Examples of such trivalent or more polyhydric alcohol (TO) are trivalent or more polyhydric aliphatic alcohol, trivalent or more polyphenol, alkylene oxide adduct of trivalent or more polyphenol, and the like.

Examples of the trivalent or more polyhydric aliphatic alcohol are glycerin, trimethylol methane, trimethylol propane, pentaerythritol, sorbitol, and the like.

Examples of the trivalent or more polyphenol are trisphenol PA, phenol novolac, cresol novolac, and the like.

Examples of the alkylene oxide adduct of trivalent or more polyphenol are the above-listed trivalent or more polyphenol adducted with alkylene oxide such as ethylene oxide, propylene oxide, butylene oxide, and the like.

In the mixture of the diol (DIO) and the trivalent or more polyhydric alcohol (TO), a mass ratio (DIO:TO) of the diol to the trivalent or more polyhydric alcohol is 100:0.01-10, and preferably 100:0.01-1.

The polycarboxylic acid (PC) is not particularly limited, and can be appropriately selected in accordance with a purpose. Examples of the polycarboxylic acid (PC) are dicarboxylic acid (DIC), trivalent or more polycarboxylic acid (TC), a mixture of dicarboxylic acid (DIC) and trivalent or more polycarboxylic acid (TC), and the like. These can be selected singly, or in combination of two or more. Among these example, dicarboxylic acid (DIC) alone or a mixture of dicarboxylic acid (DIC) and trivalent or more polycarboxylic acid (TC) is preferable.

Examples of the dicarboxylic acid are alkylene dicarboxylic acid, alkenylene dicarboxylic acid, aromatic dicarboxylic acid, and the like.

Examples of the alkylene dicarboxylic acid are succinic acid, adipic acid, sebacic acid, and the like.

Examples of the alkenylene dicarboxylic acid are alkenylene dicarboxylic acid having 4-20 carbon atoms, such as maleic acid, fumaric acid, and the like.

Examples of the aromatic dicarboxylic acid are aromatic dicarboxylic acids having 8-20 carbon atoms such as phthalic acid, isophthalic acid, terephthalic acid, naphthalene dicarboxylic acid, and the like.

Among these examples, alkenylene dicarboxylic acid having 4-20 carbon atoms, and aromatic dicarboxylic acid having 8-20 carbon atoms are preferable.

The trivalent or more polycarboxylic acid (TC) is preferably selected from trivalent to octavalency polycarboxylic acids, such as aromatic polycarboxylic acid.

Examples of the aromatic polycarboxylic acid are aromatic polycarboxylic acids having 9-20 carbon atoms such as trimellitic acid, pyromellitic acid, and the like.

The polycarboxylic acid (PC) may also be an acid anhydride or lower alkyl ester of one selected from the above-listed dicarboxylic acid (DIC), the above-listed trivalent or more polycarboxylic acid (TC), the above-listed mixture of dicarboxylic acid (DIC) and trivalent or more polycarboxylic acid (TC). Examples of the lower alkyl ester are methyl ester, ethyl ester, isopropyl ester, and the like.

In the mixture of dicarboxylic acid (DIC) and trivalent or more polycarboxylic acid (TC), a mass ratio (DIC:TC) of the dicarboxylic acid (DIC) to the trivalent or more polycarboxylic acid (TC) can be appropriately adjusted in accordance with a purpose without any limitation, and, for example, is preferably 100:0.1-10, preferably 100:0.01-1.

At the time of subjecting the polyol (PO) and the polycarboxylic acid (PC) polymerization condensation reaction, a mixing ratio thereof is not particularly limited, and can be selected in accordance with a purpose.

For example, a mixing ratio of the polyol (PO) to polyvalent carboxylic acid (PC), defined as an equivalent ratio [OH]/[COOH] of a hydroxyl group [OH] to a carboxyl group [COOH], is 2/1 to 1/1, preferably 1.5/1 to 1/1, and more preferably 1.3/1 to 1.02/1.

The polyol (PO) content of the (A) polyester prepolymer having an isocyanate group is not particularly, and can be adjusted in accordance with a purpose. Such content is, for example, 0.5% by mass to 40% by mass, preferably 1% by mass to 30% by mass, and more preferably 2% by mass to 20% by mass.

In the case that the polyol (PO) content is less than 0.5% by mass, offset resistance becomes degraded, thereby being difficult to realize both heat resistance preservation and low-temperature fixing properties. In the case that the polyol (PO) content is more than 40% by mass, low-temperature fixing properties may become degraded.

The aforementioned polyvalent isocyanate (PIC) is not particularly limited, and can be appropriately selected in accordance with a purpose. Examples of the polyvalent isocyanate (PIC) are aliphatic polyvalent isocyanate, alicyclic polyvalent isocyanate, aromatic diisocyanate, aromatic aliphatic diisocyanate, isocyanurate, phenol derivative thereof, blocked products thereof with such as oxime, caprolactam, and the like.

Examples of the aliphatic polyvalent isocyanate are tetramethylen diisocyanate, hexamethylen diisocyanate, 2,6-diisocyanate methyl caproate, octamethylene diisocyanate, decamethylene diisocianate, dodecamethylene diisocyanate, tetradecamethylene diisocyanate, trimethyl hexane diisocyanate, tetramethyl hexane diisocyanate, and the like.

Examples of the alicyclic polyvalent isocyanate are isophorone diisocyanate, cyclohexylmethane diisocyanate, and the like.

Examples of aromatic diisocyanate are tolylene diisocyanate, diphenylmethane diisocyanate, 1,5-naphthylene diisocyanate, diphenylene-4,4'- disocyanate, 4,4'-diisocyanato-3,3'-dimethyl diphenyl, 3-methyldiphenyl methane-4,4'-diisocyanate, diphenylether-4,4'-diisocyanate, and the like.

Examples of the aromatic aliphatic polyvalent isocyanate are α, α, α', α'-tetramethyl xylylene diisocyanate, and the like.

Examples of the isocyanurate are tris-isocyanatoalkyl-isocyanurate, triisocyanatocycroalkyl-isocyanurate, and the like.

These can be selected singly or in combination of two or more.

At the time of reacting the polyvalent isocyanate (PIC) and the active hydrogen group-containing polyester such as hydrogen group-containing polyester, a mixing ratio which is defined as an equivalent ratio [NCO]/[OH] of an isocyanate group [NCO] to a hydroxyl group [OH] of the hydroxyl group-containing polyester, is 5/1 to 1/1, preferably 4/1 to 1.2/1, and more preferably 3/1 to 1.5/1. In the case that the molar ratio of [NCO] in the ratio is more than 5, it is liable to degrade low-temperature fixing properties. In the case that the molar ratio of [NCO] is less than 1, it is liable to degrade offset resistance.

The polyvalent isocyanate (PIC) content of the (A) polyester prepolymer having an isocyanate group is 0.5% by mass to 40% by mass, preferably 1% by mass to 30% by mass, and more preferably 2% mass to 20% by mass. In the case that the content is less than 0.5% by mass, it is liable to degrade offset resistance. In the case that the content is more than 40% by mass, it is liable to degrade low-temperature fixing properties.

The average number of isocyanate groups contained in the (A) polyester prepolymer containing an isocyanate group is 1 or more per molecule of the (A) polyester prepolymer, preferably 1.2 to 5 per molecule, and more preferably 1.5 to 4 per molecule. In the case that the average number of isocyanate groups is less than 1 per molecule, the molecular mass of the urea modified polyester becomes low which makes hot-offset resistance poor.

The mass average molecular mass (Mw) of the polymer capable of reacting with the active hydrogen group-containing compound is 3,000 to 40,000, and preferably 4,000 to 30,000, in terms of a molecular mass distribution of a tetrahydrofuran (THF) soluble part measured by means of gel permeation chromatography (GPC).

In the case that the mass average molecular mass (Mw) is less than 3,000, it is liable to degrade heat resistance preservation. In the case that mass average molecular mass (Mw) is more than 40,000, it is liable to degrade low-temperature fixing properties.

The measurement of molecular mass distribution by means of the gel permeation chromatography (GPC) can be carried out by the following manner.

At first, a column is set and secured in a heat chamber at the interior temperature of 40° C. While maintaining the same interior temperature, tetrahydrofuran (THF) as a column solvent is flown into the column at the flow velocity of 1 ml/min. To this flow, there is introduced 50 μl to 200 μl of a tetrahydrofuran solution of a resin sample wherein the resin sample concentration is adjusted to 0.05% by mass to 0.6% by mass. The resin sample is then measured. In the measurement, the molecular mass distribution of the resin sample is calculated from the relationship between the logarithm values of calibration curve prepared from plurality of singly dispersed standard-polystyrene samples, and the counting number. The standard-polyester samples for calibration are, for example, standard polyester samples each respectively having a molecular mass of $6\times10^2$, $2.1\times10^2$, $4\times10^2$, $1.75\times10^4$, $1.1\times10^5$, $3.9\times10^5$, $8.6\times10^5$, $2\times10^6$, and $4.48\times10^6$, all of which are commercially available from Pressure Chemical Co. or Toyo Soda Co. Ltd., and are preferably about 10 standard polyester samples. Note that a refractive index (RI) detector can be used as a detector in the above measurements.

--Other Components--

The other components are not particularly limited, and can be appropriately selected in accordance with a purpose. The other components to be contained are, for example, a colorant, a charge controlling agent, fine resin particles, a flowability improver, a cleaning improver, a magnetic material, metal soap, and the like.

The colorant is not particularly limited, and can be appropriately selected in accordance with a purpose.

Examples of the colorant are carbon black, nigrosine dye, iron black, naphthol yellow S, Hansa yellow (10G, 5G, and G), cadmium yellow, yellow iron oxide, yellow ocher, yellow lead, titanium yellow, polyazo yellow, oil yellow, Hansa yellow (GR, A, RN, R), pigment yellow L, benzidine yellow (G, GR), permanent yellow (NCG), vulcan fast yellow (5G, R), tartrazinelake yellow, quinoline yellow lake, anthrasane yellow BGL, isoindolinon yellow, colcothar, red lead, lead vermilion, cadmium red, cadmium mercury red, antimony vermilion, permanent red 4R, para red, fiser red, parachloroorthonitro anilin red, lithol fast scarlet G, brilliant fast scarlet, brilliant carmine BS, permanent red (F2R, F4R, FRL, FRLL, F4RH), fast scarlet VD, vulcan fast rubin B, brilliant scarlet G, lithol rubin GX, permanent red F5R, brilliant carmin 6B, pigment scarlet 3B, bordeaux 5B, toluidine Maroon, permanent bordeaux F2K, Helio bordeaux BL, bordeaux 10B, BON maroon light, BON maroon medium, eosin lake, rhodamine lake B, rhodamine lake Y, alizarin lake, thioindigo red B, thioindigo maroon, oil red, quinacridon red, pyrazolone red, polyazo red, chrome vermilion, benzidine orange, perinone orange, oil orange, cobalt blue, cerulean blue, alkali blue lake, peacock blue lake, victoria blue lake, metal-free phthalocyanin blue, phthalocyanin blue, fast sky blue, indanthrene blue (RS, BC), indigo, ultramarine, iron blue, anthraquinon blue, fast violet B, methylviolet lake, cobalt purple, manganese violet, dioxane violet, anthraquinon violet, chrome green, zinc green, chromium oxide, viridian green, emerald green, pigment green B, naphthol green B, green gold, acid green lake, malachite green lake, phthalocyanine green, anthraquinon green, titanium oxide, zinc flower, lithopone, and the like. These can be selected singly or in combination of two or more.

The colorant content of the toner is not particularly limited, and can be appropriately adjusted in accordance with a purpose. The colorant content is preferably 1% by mass to 15% by mass, and more preferably 3% by mass to 10% by mass.

In the case that the colorant content is less than 1% by mass, it is liable to lower tinting strength of the toner. In the case that the colorant content is more than 15% by mass, it is liable to adversely affect the dispersibility of the colorant in the toner particles, which results in lowering tinting strength and charging ability of the toner.

The colorant may be used as a master batch compounded with a resin.

The resin for use is not particularly limited, and can be appropriately selected in accordance with a purpose. Examples of the binder resin in the master batch are styrene or substituted polymer thereof, styrene copolymer, polymethyl methacrylate, polybutyl methacrylate, polyvinyl chloride, polyvinyl acetate, polyethylene, polypropylene, polyester, epoxy resin, epoxy polyol resin, polyurethane, polyamide, polyvinyl butyral, polyacrylate, rosin, modified rosin, terpene resin, aliphatic hydrocarbon resin, alicyclic hydrocarbon resin, aromatic petroleum resin, chlorinated paraffin, paraffin, and the like. These can be selected singly, or in combination of two or more.

Examples of the styrene or substituted polymer thereof are polyester, polystyrene, poly-p-chlorostyrene, polyvinyl toluene, and the like. Examples of the styrene copolymer are styrene-p-clorostyrene copolymer, styrene-propylene copolymer, styrene-vinyl toluene copolymer, styrene-vinyl naphthalene copolymer, styrene-methylacrylate copolymer, styrene-ethylacrylate copolymer, styrene-butylacrylate copolymer, styrene-octylacrylate copolymer, styrene-methylmethacrylate copolymer, styrene-ethylmethacrylate copolymer, styrene-butylmethacrylate copolymer, styrene-methyl-α-chloromethacylate copolymer, styrene-acrylonitril copolymer, styrene-vinylmethylketone copolymer, styrene-butadiene copolymer, styrene-isoprene copolymer, styrene-acrylonitrile-indene copolymer, styrene-maleic acid copolymer, styrene-maleic ester copolymer, and the like.

The master batch is prepared, for example, by mixing or kneading the resin for the master batch and the colorant at high shear force. During this process, it is preferable to add an organic solvent so as to enforce interaction between the colorant and the resin. In addition, flashing method is also preferable for preparing the master batch since the pigment can be employed in the form of wetcake without drying. In the flashing method, an aqueous paste of the pigment and water is mixed or kneaded together with the resin and the organic solvent, the colorant is gradually transferred into the resin, and then the water and organic solvent are removed. For the aforementioned fixing or kneading, high shear force dispersing device, such as three-roller mills and the like are suitably used.

The releasing agent is not particularly limited and can be selected from the conventional releasing agents in accordance with a purpose. Examples of the releasing agent are wax and the like.

Examples of the wax are a carbonyl group-containing wax, polyolefin wax, long-chain hydrocarbon, and the like. Each of these can be employed alone or in combination of two or more. Of these examples, the carbonyl group-containing wax is preferable.

Examples of the carbonyl group-containing wax are polyalkanoic ester, polyalkanol ester, polyalkanoic acid amide, polyalkyl amide, dialkyl ketone, and the like. Examples of the polyalkanoic ester are carnauba wax, montan wax, trimethylolpropane tribehenate, pentaerythritol tetrabehenate, pentaerythritol diacetate dibehenate, glycerin tribehenate, octadecan-1,18-diol distearate, and the like. Examples of the polyalkanol ester are trimellitic tristearate, distearyl maleate, and the like. Examples of the polyalkanoic acid amide are behenyl amide and the like. Examples of the polyalkyl amide are trimellitic acid tristearyl amide, and the like. Examples of the dialkyl ketone are distearyl ketone, and the like. Of these carbonyl group-containing wax, the polyalkanoic ester is particularly preferable.

Examples of the polyolefin wax are polyethylene wax, polypropylene wax, and the like.

Examples of the long-chain hydrocarbon are paraffin wax, Sasol Wax, and the like.

A melting point of the wax is not particularly limited, and can be appropriately selected in accordance with a purpose. It is 40° C. to 160° C., preferably 50° C. to 120° C., and more preferably 60° C. to 90° C.

In the case that the melting point is less than 40° C., it adversely affects on heat-resistance preservation of the wax. In the case that the melting point is more than 160° C., it is liable to cause cold offset at a relatively low temperature at the time of fixing.

A melt viscosity of the wax is preferably 5 cps to 1,000 cps, and more preferably 10 cps to 100 cps by a measurement at a temperature of 20° C. higher than the melting point of the wax.

In the case that the melt viscosity is less than 5 cps, a releasing ability is liable to be insufficient. In the case that the melt viscosity is more than 1,000 cps, on the other hand, it may not improve offset resistance, and low-temperature fixing property.

The releasing agent content of the toner is not particularly limited, and can be appropriately adjusted in accordance with a purpose. For example, the releasing agent content is preferably 0 to 40% by mass, and more preferably 3% by mass to 30% by mass. In the case that the releasing agent content is more than 40% by mass, it is liable to degrade the flowability of the toner.

The charge controlling agent is not particularly limited, and can be appropriately selected from conventionally available ones in accordance with a purpose. The charge controlling agent is preferably formed of a material having a color close to transparent and/or white.

Examples of the charge controlling agent are triphenylmethane dye, molybdic acid chelate pigment, rhodamine dye, alkoxy amine, quaternary ammonium salt such as fluoride-modified quaternary ammonium salt, alkylamide, phosphoric simple substance or compound thereof, tungsten itself or compound thereof, fluoride activator, salicylic acid metallic salt, salicylic acid derivative metallic salt, and the like. These can be selected singly or in combination of two or more.

The charge controlling agent for use in the present invention is also selected from the commercially available products. Specifically examples thereof are: Bontron P-51 of a quaternary ammonium salt, Bontron E-82 of an oxynaphthoic acid metal complex, Bontron E-84 of a salicylic acid metal complex, and Bontron E-89 of a phenol condensate (by Orient Chemical Industries, Ltd.); TP-302 and TP-415 of a quaternary ammonium salt molybdenum metal complex (by Hodogaya Chemical Co.); Copy Charge PSY VP2038 of a quaternary ammonium salt, Copy Blue PR of a triphenylmethane derivative, and Copy Charge NEG VP2036 and Copy Charge NX VP434 of a quaternary ammonium salt (by Hoechst Ltd.); LRA-901, and LR-147 of a boron metal complex (by Japan Carlit Co., Ltd.), quinacridone, azo pigment, and other high-molecular mass compounds having a functional group, such as sulfonic acid group, carboxyl group, and quaternary ammonium salt, and the like.

The charge controlling agent may be dissolved and/or dispersed in the toner material after kneading with the master batch. The charge controlling agent may also be added at the time of dissolving and dispersing in the organic solvent together with the toner material. In addition, the charge controlling agent may be added onto the surface of the toner particles after preparing the toner particles.

The usage amount of the charge controlling agent is determined depending on the type of a binder resin, presence or absence of an additive to be used as required, and the method for manufacturing a toner including a dispersion process and is not limited uniformly; preferably, to 100 parts by mass of binder resin, 0.1 part by mass to 10 parts by mass of the charge controlling agent is used and more preferably with 0.2 part by mass to 5 part by mass of the charge controlling agent. In the case that the usage amount is less than 0.1 parts by mass, charge may not be appropriately controlled. In the case that the charge controlling agent is more than 10 parts by mass, charge ability of the toner become exceedingly large, which lessens the effect of the charge controlling agent itself and increases in electrostatic attraction force with a developing roller, and causes degradations of developer fluidity and image density.

The fine inorganic particles are not particularly limited, and can be appropriately selected from the conventional fine inorganic particles.

Suitable examples thereof are silica, alumina, titanium oxide, barium titanate, magnesium titanate, calcium titanate, strontium titanate, zinc oxide, tin oxide, silica sand, clay, mica, wollastonite, diatomaceous earth, chromium oxide, cerium oxide, iron oxide red, antimony trioxide, magnesium oxide, zirconium oxide, barium sulfate, barium carbonate, calcium carbonate, silicon carbide, silicon nitride, and the like. These may be selected singly, or in combination of two or more.

The primary particle diameter of the fine inorganic particle is preferably 5 nm to 2 μm, and more preferably 5 nm to 500 nm. The specific surface of the fine inorganic particle is preferably 20 $m^2/g$ to 500 $m^2/g$ according to BET method.

The fine inorganic particle content of the toner is preferably 0.01% by mass to 5.0% by mass, and more preferably 0.01% by mass to 2.0% by mass.

The aforementioned flowability improver is surface treated to have improved hydrophobic properties, and is capable of inhibiting the degradation of flowability or charging ability under high humidity environment.

Suitable examples of the flowability improver are a silane coupling agent, a sililating agent, a silane coupling agent having a fluorinated alkyl group, an organotitanate coupling agent, an aluminum coupling agent, silicone oil, modified silicone oil, and the like.

The aforementioned cleaning improver is added to the toner to remove the residual developer on a latent electrostatic image bearing member or a primary transferring member after transferring.

Suitable example of the cleaning improver are fatty acid metal salt for example metal salt of stearic acid, such as zinc stearate, calcium stearate, and the like, fine polymer particles formed by soap-free emulsion polymerization, such as fine polymethylmethacrylate particles and fine polyethylene particles, and the like. The fine polymer particles have preferably a narrow particle size distribution. It is preferred that the volume average particle diameter thereof is 0.01 μm to 1 μm.

The magnetic material is not particularly limited and can be appropriately selected from the conventional magnetic material in accordance with a purpose. Suitable examples thereof are magnetite, ferrite, and the like. Among these, one having a white color is preferable in terms of tone.

In the preferred embodiment of the method for producing a toner of the present invention, the oil phase is prepared by dissolving and/or dispersing, in the organic solvent, the toner material comprising the active hydrogen group-containing compound, the polymer capable of reacting with an active hydrogen group-containing compound, the colorant, the releasing agent, the charge controlling agent, and the like.

The toner material other than the active hydrogen group-containing compound and the polymer capable of reacting with an active hydrogen group-containing compound (prepolymer) can be mixed and/or added to an aqueous phase described below at the time of dispersing resin particles in the aqueous medium. Alternatively, such toner material may be added together with the oil phase at the time of adding the oil phase into the aqueous phase.

--Aqueous Phase--

The aqueous phase is not particularly limited, and can be appropriately selected in accordance with a purpose. Examples of the aqueous phase are water, a solvent compatible with water, a mixture thereof, and the like.

Examples of the solvent compatible with water are alcohol, dimethyl formamide, tetrahydrofuran, Cellosolve, lower ketone, and the like.

Examples of the alcohol are methanol, isopropanol, ethylene glycol and the like. Examples of the lower ketone are acetone, methylethylketone, and the like. These can be selected singly or in combination of two or more.

The aqueous phase is prepared, for example, by dispersing resin particles in the aqueous phase. The added amount of the resin particles to the aqueous phase is not particularly limited, and can be appropriately adjusted in accordance with a purpose. It is preferably that the added amount of the resin particles is 0.5% by mass to 10% by mass.

The resin particles are not particularly limited, provided that the resin particles are capable of forming aqueous dispersion by being added to the aqueous phase, and the material thereof can be appropriately selected from the conventional resins in accordance with a purpose. The resin particles may be formed of thermoplastic resin or thermosetting resin.

Examples of the material of the resin particles are vinyl resin, polyurethane resin, epoxy resin, polyester resin, polyamide resin, polyimide resin, silicone resin, phenol resin, melamine resin, ure resin, anilline resin, ionomer resin, polycarbonate resin, and the like. These may be selected singly or in combination of two or more, for use as the fine resin particles. Among these examples, the resin particles are preferably formed of one selected from the vinyl resin, polyurethane resin, epoxy resin, and polyester resin in view of an easy formation of aqueous dispersion of fine and spherical resin particles.

The vinyl resin is a polymer in which vinyl monomer is mono- or co-polymerized. Examples of the vinyl resin are styrene-(meth)acrylic ester resin, styrene-butadiene l copolymer, (metha)acrylic acid-acrylic ester copolymer, sthrene-acrylonitrile copolymer, styrene-maleic anhydride copolymer, styrene-(metha)acrylic acid copolymer, and the like.

Moreover, the resin particles may be formed of copolymer containing a monomer having two or more unsaturated groups. The monomer having two or more unsaturated groups is not particularly limited, and can be selected in accordance with a purpose. Examples of such monomer are sodium salt of sulfuric acid ester of ethylene oxide adduct of methacrylic acid (Eleminol RS-30, by Sanyo Chemical Industries Co.), divinylbenzene, hexane-1,6-diol acrylate, and the like.

The resin particles are formed by polymerizing the above-listed monomers in accordance with a method appropriately selected from conventional methods. The fine resin particles are preferably obtained in the form of aqueous dispersion of the resin particles. Examples of preparation method of such aqueous dispersion are the following (1)-(8):

(1) a preparation method of aqueous dispersion of the resin particles, in which, in the case of the vinyl resin, a vinyl monomer as a starting material is polymerized by suspension-polymerization method, emulsification-polymerization method, seed polymerization method or dispersion-polymerization method;

(2) a preparation method of aqueous dispersion of the resin particles, in which, in the case of the polyaddition and/or condensation resin such as the polyester resin, the polyurethane resin, or the epoxy resin, a precursor (monomer, oligomer or the like) or solvent solution thereof is dispersed in an aqueous medium in the presence of an appropriate dispersing agent, and sequentially is heated or added with a curing agent so as to be cured, thereby obtaining the aqueous dispersion of the resin particles;

(3) a preparation method of aqueous dispersion of the resin particles, in which, in the case of the polyaddition and/or condensation resin such as the polyester resin, the polyurethane resin, or the epoxy resin, an arbitrary selected emulsifier is dissolved in a precursor (monomer, oligomer or the like) or solvent solution thereof (preferably being liquid, or being liquidized by heating), and then water is added thereto so that a phase inversion emulsification is induced, thereby obtaining the aqueous dispersion of the resin particles;

(4) a preparation method of aqueous dispersion of the fine resin particles, in which a previously prepared resin by a polymerization method, which is any of addition polymerization, ring-opening polymerization, polyaddition, addition condensation or condensation polymerization, is pulverized by means of a pulverizing mill such as mechanical rotation-type, jet-type or the like, the thus obtained resin powder is classified to thereby obtain resin particles, and then the resin particles are dispersed in an aqueous medium in the presence of an arbitrary selected dispersing agent, thereby obtaining the aqueous dispersion of the resin particles;

(5) a preparation method of aqueous dispersion of the resin particles, in which a previously prepared resin by a polymerization method, which is any of addition polymerization, ring-opening polymerization, polyaddition, addition condensation or condensation polymerization, is dissolved in a solvent to thereby obtain a resin solution, the resin solution is sprayed in the form of mist to thereby obtain resin particles, and then the thus obtained resin particles are dispersed in an aqueous medium in the presence of an arbitrary selected dispersing agent, thereby obtaining the aqueous dispersion of the resin particles;

(6) a preparation method of aqueous dispersion of the resin particles, in which a previously prepared resin by a polymerization method, which is any of addition polymerization, ring-opening polymerization, polyaddition, addition condensation, or condensation polymerization, is dissolved in a solvent to thereby obtain a resin solution, the resin solution is subjected to precipitation by adding a poor solvent thereto or cooling after heating and dissolving, the solvent is sequentially removed to thereby obtain resin particles, and then the thus obtained fine resin particles are dispersed in an aqueous medium in the presence of an arbitrary selected dispersing agent, thereby obtaining the aqueous dispersion of the resin particles;

(7) a preparation method of aqueous dispersion of the resin particles, in which a previously prepared resin by a polymerization method, which is any of addition polymerization, ring-opening polymerization, polyaddition, addition condensation or condensation polymerization, is dissolved in a solvent to thereby obtain a resin solution, the resin solution is dispersed in an aqueous medium in the presence of an arbitrary selected dispersing agent, and then the solvent is removed by heating or reduced pressure to thereby obtain the aqueous dispersion of the resin particles;

(8) a preparation method of aqueous dispersion of the resin particles, in which a previously prepared resin by a polymerization method, which is any of addition polymerization, ring-opening polymerization, polyaddition, addition condensation or condensation polymerization, is dissolved in a solvent to thereby obtain a resin solution, an arbitrary selected emulsifier is dissolved in the resin solution, and then water is added to the resin solution so that phase inversion emulsification is induced, thereby obtaining the aqueous dispersion of the resin particles.

-Emulsification and/or Dispersion-

The emulsification and/or dispersion of the oil phase in the aqueous phase is preferably performed by dispersing the oil phase in the aqueous phase while stirring. The method of dispersing is not particularly limited, and can be appropriately selected from usage of the conventional dispersers. Examples of such dispersers are a low-speed-shear disperser, a high-speed-shear disperser, a friction disperser, a high-pressure-jet disperser, an ultrasonic disperser and the like. Among these, the high-speed-shear disperser is preferable in view of that it is capable of controlling the size of the oil droplets (dispersed particles) at 3 μm to 8 μm.

In the case that the high-speed-shear disperser is selected as a disperser, the conditions such as rotation frequency, dispersing time, peripheral velocity of a stirring blade, dispersing temperature and the like are not particularly limited, and can be appropriately adjusted in accordance with a purpose. For example, the rotation frequency is preferably 1,000 rpm to 30,000 rpm, and more preferably 5,000 rpm to 20,000 rpm, and the peripheral velocity of a stirring blade is 5 m/s to 30 m/s. In the case of the batch method, the dispersing time is preferably 0.1 minutes to 5 minutes, and the dispersing temperature is preferably 0 to 150° C., and more preferably 10° C. to 98° C. under pressure. Generally speaking, the dispersion is more easily carried out at a high dispersing temperature.

In the preferred embodiment of the present invention, the active hydrogen group-containing compound and the polymer capable of reacting therewith are allowed to elongation reaction and/or crosslinking reaction to thereby form an adhesive base material at the time of the emulsifying and/or dispersing.

--Adhesive Base Material--

The adhesive base material exhibits adhesion to a recording medium such as a paper, and comprises an adhesive polymer resulted from a reaction, in an aqueous medium, of the active hydrogen group-containing compound and a polymer capable of reacting the active hydrogen group-containing compound. The adhesive base material may further comprise a binder resin appropriately selected from the conventional binder resins.

A mass average molecular mass (Mw) of the adhesive base material is not particularly limited and can be appropriately adjusted in accordance with a purpose. It is 3,000 or more, preferably 5,000 to 1,000,000, and more preferably 7,000 to 500,000.

In the case that the mass average molecular mass of the adhesive base material is less than 3,000, it is liable to adversely affect on offset resistance.

A glass transition temperature (Tg) of the adhesive base material is not particularly limited and can be appropriately adjusted in accordance with a purpose. It is 30° C. to 70° C., and preferably 40° C. to 65° C. Since the adhesive base material is contained in the toner together with the polyester resin which is crosslinked, and elongation reacted, the toner has a desirable heat resistance preservation even having the lower glass transition temperature than that of the conventional polyester toners.

In the case that the glass transition temperature of the adhesive base material is less than 30° C., it is liable to adversely affect on a heat resistance preservation of the toner. In the case that the glass transition temperature of the adhesive base material is more than 70° C., low-temperature fixing properties of the toner is liable to be insufficient.

The glass transition temperature is measured, for example, by means of TG-DSC/TAS-100 system (manufactured by Rigaku Corp.). A specific method is explained hereinafter.

About 10 mg of a toner sample is charged in a sample container formed of aluminum; the sample container is placed on a holder unit; the holder unit is set in an electric oven. The temperature therein is increased from an ambient temperature to 150° C. at 10° C./min.; the temperature is kept at 150° C. for 10 minutes; the sample toner is then cooled down to an ambient temperature and left to stand for 10 minutes. The sample toner is then heated up to 150° C. at 10° C./min under $N_2$ atmosphere; a DSC spectrum of the sample toner is measured by a differential scanning calorimeter. The glass transition temperature is calculated, by means of TG-DSC/TAS-100 system, based on a contact point of a tangent line of the endothermic carve nearby a glass transition temperature and a base line.

Specific examples of the adhesive base material are particularly limited and can be appropriately selected in accordance with a purpose. Suitable examples thereof are a polyester resin, and the like.

The polyester resin is not particularly limited and can be selected in accordance with a purpose. Suitable examples thereof are urea-modified polyester and the like.

The urea modified polyester which is obtained by reacting (B) amines as the active hydrogen-containing compound, and (A) a polyester prepolymer having an isocyanate group as the polymer capable of reacting with the active hydrogen-containing compound in the aqueous phase.

In addition, the urea modified polyester may include a urethane bond as well as a urea bond. A molar ratio of the urea bond content to the urethane bond content is preferably 100/0 to 10/90, more preferably 80/20 to 20/80, and further more preferably 60/40 to 30/70. In the case that a molar ratio of the urea bond is less than 10, it is liable to adversely affects on hot-offset resistance.

Specific examples of the urea-modified polyester are preferably the following (1)-(10):

(1) A mixture of (i) polycondensation product of bisphenol A ethyleneoxide dimole adduct and isophthalic acid, and (ii) urea-modified polyester prepolymer which is obtained by reacting isophorone disocyanate with a polycondensation product of bisphenol A ethyleneoxide dimole adduct and isophtalic acid so as to form polyester prepolymer, and modifying the polyester prepolymer with isophorone diamine;

(2) A mixture of (iii) a polycondensation product of bisphenol A ethyleneoxide dimole adduct and terephthalic acid, and (ii) urea-modified polyester prepolymer which is obtained by reacting isophorone disocyanate with a polycondensation product of bisphenol A ethyleneoxide dimole adduct and terephthalic acid so as to form polyester prepolymer, and modifying the polyester prepolymer with isophorone diamine;

(3) A mixture of (iv) polycondensation product of a bisphenol A ethyleneoxide dimole adduct, a bisphenol A propyleneoxide dimole adduct and terephthalic acid, and (v) urea-modified polyester prepolymer which is obtained by reacting isophorone disocyanate with a polycondensation product of a bisphenol A ethyleneoxide dimole adduct, a bisphenol A propyleneoxide dimole adduct and terephthalic acid so as to form polyester prepolymer, and modifying the polyester prepolymer with isophorone diamine;

(4) A mixture of (vi) polycondensation product of a bisphenol A propyleneoxide dimole adduct and terephthalic acid, and (v) urea-modified polyester prepolymer which is obtained by reacting isophorone disocyanate with a polycondensation product of a bisphenol A ethyleneoxide dimole adduct, a bisphenol A propyleneoxide dimole adduct and terephthalic acid so as to form polyester prepolymer, and modifying the polyester prepolymer with isophorone diamine;

(5) A mixture of (iii) polycondensation product of a bisphenol A ethyleneoxide dimole adduct and terephthalic acid, and (vii) urea-modified polyester prepolymer which is obtained by reacting isophorone disocyanate with a polycondensation product of a bisphenol A ethyleneoxide dimole adduct and terephthalic acid so as to form polyester prepolymer, and modifying the polyester prepolymer with hexamethylene diamine;

(6) A mixture of (iv) polycondensation product of a bisphenol A ethyleneoxide dimole adduct, a bisphenol A propyleneoxide dimole adduct and terephthalic acid, and (vii) urea-modified polyester prepolymer which is obtained by reacting isophorone disocyanate with a polycondensation product of a bisphenol A ethyleneoxide dimole adduct and terephthalic acid so as to form polyester prepolymer, and modifying the polyester prepolymer with hexamethylene diamine;

(7) A mixture of (iii) polycondensation product of a bisphenol A ethyleneoxide dimole adduct and terephthalic acid, and (viii) urea-modified polyester prepolymer which is obtained by reacting isophorone disocyanate with a polycondensation product of a bisphenol A ethyleneoxide dimole adduct and terephthalic acid so as to form polyester prepolymer, and modifying the polyester prepolymer with ethylene diamine;

(8) A mixture of (i) polycondensation product of a bisphenol A ethyleneoxide dimole adduct and isophthalic acid, and (ix) urea-modified polyester prepolymer which is obtained by reacting diphenylmethane disocyanate with a polycondensation product of a bisphenol A ethyleneoxide dimole adduct and isophthalic acid so as to form polyester prepolymer, and modifying the polyester prepolymer with hexamethylene diamine;

(9) A mixture of (iv) polycondensation product of a bisphenol A ethyleneoxide dimole adduct, a bisphenol A propyleneoxide dimole adduct and terephthalic acid, and (x) urea-modified polyester prepolymer which is obtained by reacting diphenylmethane disocyanate with a polycondensation product of a bisphenol A ethyleneoxide dimole adduct/bisphenol A propyleneoxide dimole adduct and terephthalic acid/dodecenylsuccinic anhydride so as to form polyester prepolymer, and modifying the polyester prepolymer with hexamethane diamine;

(10) A mixture of (i) polycondensation product of a bisphenol A ethyleneoxide dimole adduct and isophthalic acid, and (xi) urea-modified polyester prepolymer which is obtained by reacting toluene disocyanate with a polycondensation product of a bisphenol A ethyleneoxide dimole adduct and isophthalic acid so as to form polyester prepolymer, and modifying the polyester prepolymer with hexamethane diamine.

---Binder Resin---

The binder resin is not particularly limited, and can be appropriately selected in accordance with a purpose. Examples of the binder resin are polyester and the like. Of these examples, unmodified polyester (polyester which is not modified) is particularly preferable.

By containing the unmodified polyester in the toner, the toner can realize improved low-temperature fixing properties and glossiness.

Examples of the unmodified polyester are a resin equivalent to the aforementioned polyester resin containing a group capable of generating urea bonding (RMPE), i.e., polycondensation product of polyol (PO) and polycarboxylic acid (PC), and the like. The unmodified polyester is preferably compatible with the polyester resin containing a group capable of generating urea bonding (RMPE) at part thereof, i.e., having a similar polymeric structure which allow to be compatible, in view of low-temperature fixing properties and hot-offset resistance.

The mass average molecular mass (Mw) of the non-polyester is 1,000 to 30,000, and preferably 1,500 to 15,000, in terms of a molecular mass distribution of a tetrahydrofuran (THF) soluble part measured by means of gel permeation chromatography (GPC).

In the case that the mass average molecular mass (Mw) is less than 1,000, it is liable to degrade heat resistance preservation. Therefore, the amount of the unmodified polyester having a mass average molecular mass is 8% by mass to 28% by mass. In the case that mass average molecular mass (Mw) is more than 30,000, it is liable to degrade low-temperature fixing properties.

The glass transition temperature of the unmodified polyester is preferably 35° C. to 70° C. In the case that the glass transition temperature is lower than 35° C., it is liable to degrade heat resistance preservation of the toner. In the case that the glass transition temperature is higher than 70° C., it is liable to degrade lower-temperature fixing properties.

The hydroxyl value of the unmodified polyester is 5 mg KOH/g or more, preferable 10 mg KOH/g to 120 mg KOH/g, and more preferably 20 mg KOH/g to 80 mg KOH/g. In the case that the hydroxyl value is less than 5 mg KOH/g, it becomes difficult to achieve both heat resistance preservation and low-temperature fixing properties.

The acid value of the unmodified polyester is 1.0 mg KOH/g to 30.0 mg KOH/g, and preferably 5.0 mg KOH/g to 20.0 mg KOH/g. By imparting the acid value to the toner, the toner is generally liable to be negatively chargeable.

When the unmodified polyester is contained in the toner, a mass ratio (RMPE/PE) of the urea-modified polyester (RMPE) to the unmodified polyester (PE) is 5/95 to 25/75, and preferably 10/90 to 25/75.

In the case that the mass ratio of the unmodified polyester (PE) is more than 95, it is liable to degrade offset resistance. In the case that the mass ratio of the unmodified polyester is less than 75, it is liable to degrade glossiness.

The unmodified polyester content of the binder resin is 50% by mass to 100% by mass, and preferably 55% by mass to 95% by mass. In the case that the unmodified polyester content is less than 50% by mass, it is liable to degrade low-temperature fixing properties, the resistance of the fixed image, and the glossiness of the image.

The adhesive base material (e.g. the aforementioned urea-modified polyester) is formed, for example, by the following method (1)-(3):

(1) the oil phase the polymer capable of reacting with the active hydrogen group-containing compound (e.g. (A) polyester prepolymer containing an isocyanate group) is emulsified and/or dispersed in the aqueous phase together with the active hydrogen group-containing compound so as to form the oil droplets, and then the active hydrogen group-containing compound and the polymer capable of reacting with the active hydrogen group-containing compound are subjected to elongation and/or crosslinking reaction in the aqueous phase;

(2) the oil phase is emulsified and/or dispersed in the aqueous phase previously added with the active hydrogen group-containing compound to form the oil droplets, and then the active hydrogen group-containing compound and the polymer capable of reacting with the active hydrogen group-containing compound are subjected to elongation and/or crosslinking reaction in the aqueous phase;

(3) the oil phase is added and mixed in the aqueous phase, the active hydrogen group-containing compound is sequentially added thereto so as to form the oil droplets, and then the active hydrogen group-containing compound and the polymer capable of reacting with the active hydrogen group-containing compound are subjected to elongation and/or crosslinking reaction at an interface of dispersed particles in the aqueous phase.

In the case of the method (3), it should be noted that modified polyester is initially formed from a surface of the thus obtained toner particles, and thus it is possible to form a contrast of the modified polyester in the toner particles.

Conditions for forming the adhesive base material by the emulsifying and/or dispersing are not particularly limited, and can be appropriately adjusted in accordance with a combination of the active hydrogen group-containing compound and the polymer capable of reacting therewith. A suitable reaction time is preferable 10 minutes to 40 hours, and more preferably 2 hours to 24 hours. A suitable reaction temperature is preferably 0 to 150° C., and more preferably 40° C. to 98° C.

A suitable formation of the oil droplets containing the active hydrogen group-containing compound and the polymer capable of reacting with the active hydrogen group-containing compound (e.g. the (A) polyester prepolymer containing an isocyanate group) in the aqueous phase is realized by, to the aqueous phase, adding the oil phase in which the toner material such as the polymer (e.g. the (A) polyester prepolymer containing an isocyanate group), the colorant, the wax, the charge controlling agent, the unmodified polyester and the like is dissolved and/or dispersed in the organic solvent, and dispersing by a-shear force.

In a course of preparing the dispersion, the usage amount of the aqueous phase is preferably 50 parts by mass to 2,000 parts by mass, and more preferably 100 parts by mass to 1,000 parts by mass with respect to the 100 parts by mass of the toner material.

In the case that the usage amount of less than 50 parts by mass, the toner material is not desirably dispersed, and thus toner particles having a predetermined particle diameter are rarely obtained. In the case that the usage amount is more than 2,000 parts by mass, on the other hand, the production cost is liable to increase.

In a course of emulsifying and/or dispersing, a dispersant is preferably used in order to stabilize the oil droplets, to obtain the predetermined shape of the oil droplets, and to sharpen the particle size distribution of the oil droplets.

The dispersant is not particularly limited, and can be appropriately selected in accordance with a purpose. Suitable examples of the dispersant are a surfactant, water-insoluble inorganic dispersant, polymeric protective colloid, and the like. These can be used singly or in combination of two or more.

Examples of the surfactant are an anionic surfactant, a cationic surfactant, a nonionic surfactant, an ampholytic surfactant.

Examples of the anionic surfactant are alkylbenzene sulfonic acid salts, α-olefin sulfonic acid salts, phosphoric acid salts, and the like. Among these, the anionic surfactant having a fluoroalkyl group is preferable. Examples of the anionic surfactant having a fluoroalkyl group are fluoroalkyl carboxylic acid having 2-10 carbon atoms or a metal salt thereof, disodium perfluorooctanesulfonylglutamate, sodium-3-{omega-fluoroalkyl ($C_6$ to $C_{11}$)oxy}-1-alkyl($C_3$ to $C_4$) sulfonate, sodium-3-{omega-fluoroalkanoyl($C_6$ to $C_8$)-N-ethylamino}-1-propanesulfonate, fluoroalkyl($C_{11}$ to $C_{20}$) carboxylic acid or a metal salt thereof, perfluoroalkyl($C_7$ to $C_{11}$) carboxylic acid or a metal salt thereof, perfluoroalkyl($C_4$ to $C_{12}$) sulfonic acid or a metal salt thereof, perfluorooctanesulfonic acid diethanol amide, N-propyl-N-(2-hydroxyethyl) perfluorooctanesulfone amide, perfluoroalkyl($C_6$ to $C_{10}$) sulfoneamidepropyltrimethylammonium salt, a salt of perfluoroalkyl ($C_6$ to $C_{10}$)-N-ethylsulfonyl glycin, monoperfluoroalkyl($C_6$ to $C_{16}$)ethylphosphate, and the like. Examples of the commercially available surfactant having a fluoroalkyl group are: Surflon S-111, S-112 and S-113 (manufactured by Asahi Glass Co.); Frorard FC-93, FC-95, FC-98 and FC-129 (manufactured by Sumitomo 3M Ltd.); Unidyne DS-101 and DS-102 (manufactured by Daikin Industries, Ltd.); Megafac F-110, F-120, F-113, F-191, F-812 and F-833 (manufactured by Dainippon Ink and Chemicals, Inc.); ECTOP EF-102, 103, 104, 105, 112, 123A, 123B, 306A, 501, 201 and 204 (manufactured by Tohchem Products Co.); Futargent F-100 and F150 (manufactured by Neos Co.).

Examples of the cationic surfactant are amine salt, quaternary amine salt, and the like. Examples of the amine salt are alkyl amine salt, aminoalcohol fatty acid derivative, polyamine fatty acid derivative, imidazoline, and the like. Examples of the quaternary ammonium salt are alkyltrimethyl ammonium salt, dialkyldimethyl ammonium salt, alkyldimethyl benzyl ammonium salt, pyridinium salt, alkyl isoquinolinium salt, benzethonium chloride, and the like. Among these, preferable examples are primary, secondary or tertiary aliphatic amine having a fluoroalkyl group, aliphatic quaternary ammonium salt such as perfluoroalkyl($C_6$ to $C_{10}$) sulfoneamidepropyltrimethylammonium salt, benzalkonium salt, benzetonium chloride, pyridinium salt, imidazolinium salt, and the like. Specific examples of the commercially available product thereof are Surflon S-121 (manufactured by Asahi Glass Co.), Frorard FC-135 (manufactured by Sumitomo 3M Ltd.), Unidyne DS-202 (manufactured by Daikin Industries, Ltd.), Megaface F-150 and F-824 (manufactured by Dainippon Ink and Chemicals, Inc.), Ectop EF-132 (manufactured by Tohchem Products Co.), and Futargent F-300 (manufactured by Neos Co.).

Examples of the nonionic surfactant are fatty acid amide derivative, polyhydric alcohol derivative, and the like.

Examples of the ampholytic surfactant are alanine, dodecyldi(aminoethyl) glycin, di(octylaminoethyle) glycin, N-alkyl-N,N-dimethylammonium betaine, and the like.

Examples of the water-insoluble inorganic dispersant are tricalcium phosphate, calcium carbonate, titanium oxide, colloidal silica, hydroxyl apatite, and the like.

Examples of the polymeric protective colloid are acid, (meth)acryl monomer having a hydroxyl group, vinyl alcohol or ester thereof, ester of vinyl alcohol and a compound having a carboxyl group, amide compound or methylol compound thereof, chloride, monopolymer or copolymer having a nitrogen atom or heterocyclic ring thereof, polyoxyethylene, cellulose, and the like.

Examples of the acid are acrylic acid, methacrylic acid, α-cycnoacrylic acid, α-cycnomethacrylic acid, itaconic acid, crotonic acid, fumaric acid, maleic acid, maleic anhydride, and the like.

Examples of the (meth)acryl monomer having a hydroxyl group are β-hydroxyethyl acrylate, β-hydroxyethyl methacrylate, β-hydroxypropyl acrylate, β-hydroxypropyl methacrylate, γ-hydroxypropyl acrylate, γ-hydroxypropyl acrylate, 3-chloro-2-hydroxypropyl acrylate, 3-chloro-2-hydroxypropyl methacrylate, diethyleneglycol monoacrylate, diethylene glycol monomethacrylate, glycerin monoacrylate, glycerin monomethacrylate, N-methylol acrylamido, N-methylol methacrylamide, and the like.

Examples of the vinyl alcohol or ester or vinyl alcohol are vinyl methyl ether, vinyl ethyl ether, vinyl propyl ether, and the like.

Examples of the ester of vinyl alcohol and a compound having a carboxyl group are vinyl acetate, vinyl propionate, vinyl butyrate, and the like.

Examples of the amide compound or methylol compound thereof are acryl amide, methacryl amide, diacetone acrylic amide acid, or methylol thereof, and the like.

Examples of the chloride are acrylic chloride, methacrylic chloride, and the like.

Examples of the monopolymer or copolymer having a nitrogen atom or heterocyclic ring thereof, are vinyl pyridine, vinyl pyrrolidone, vinyl imidazole, etjulene imine, and the like.

Examples of the polyoxyethylene are polyoxyethylene, polyoxypropylene, polyoxyethylene alkyl amine, polyoxypropylene alkylamine, polyoxyethylene alkylamide, polyoxypropylene alkylamide, polyoxyethylene nonylphenylether, polyoxyethylene laurylphenylether, polyoxyethylene stearylarylphenyl ester, polyoxyethylene nonylphenyl ester, and the like.

Examples of the cellulose are methyl cellulose, hydroxyethyl cellulose, hydroxypropyl cellulose, and the like.

In the preparation of the dispersion, a dispersing stabilizer is employed, if necessary. The dispersing stabilizer is, for example, acid such as calcium phosphate, alkali-soluble compound, or the like.

In the case that the dispersing stabilizer is employed, the dispersing stabilizer is dissolved by acid such as hydrochloric acid, and then is washed with water or decomposed by a enzyme, thereby being removed from particles.

In the preparation of the dispersion, a catalyst for the elongation and/or crosslinking reaction is employed, if necessary. The catalyst is, for example, dibutyltin laurate, dioctyltin laurate, and the like.

-Oil Droplets-

The oil droplets are the oil phase which is emulsified and/or dispersed in the aqueous phase.

The oil droplets are formed by emulsifying and/or dispersing the oil phase in the aqueous phase. Therefore, the components of the oil droplets are identical to the components of the oil phase. Specifically, the oil droplets comprise at least one of monomer, polymer, an active hydrogen group-containing compound, and a polymer capable of reacting with an active hydrogen group-containing compound. Each of the oil droplets optionally further comprises a toner material containing other components such as a colorant, a releasing agent, a charge controlling agent, and the like. Preferably, each of the oil droplets comprises an organic solvent together with the toner materials, and is formed by dissolving and/or dispersing the toner material in the organic solvent.

The viscosity of the oil droplets is determined, for example, by measuring dynamic viscoelasticity. The flowability of the oil droplets is determined, for example, by measuring Casson yield value.

The measurement of the dynamic viscoelasticity of the oil droplets is not particularly limited, and can be appropriately selected in accordance with a purpose. For example, the dynamic viscoelasticity of the oil droplets is calculated from a flow curve (i.e. hysteresis curve) measured by means of High-Shear Viscometer (AR 2000, manufactured by TA Instruments).

The oil droplets preferably have Casson yield value of 0.5 Pa to 10,000 Pa at the time of aggregating or removing the organic solvent.

In the case that the Casson yield value is less than 0.5 Pa, the suitably deformed toner may not be obtained. In the case that the Casson yield value is more than 10,000 Pa, the viscosity or flowability of the oil droplets becomes excessively high so that the productivity of the toner is worsened.

Note that, when the Casson yield value is less than 0.5 Pa, the oil droplets may exhibit structural viscosity, but such structural viscosity is very weak and thus exhibit similar conditions to Newtonian viscosity.

The Casson yield value is described in various publications, for example, Shigeharu Onoki, 'Rheology for Chemist' Kagaku-dojin Publishing Company, Inc, p. 37. The Casson yield value is obtained by Casson equation expressed by the following equation (1). As shown in FIG. 1, Casson yield value shows the shear force at the time the shear velocity is nil.

$$\sqrt{\tau}-\sqrt{\tau 0}=\sqrt{E_{ta}\times D} \quad \text{Equation (1)}$$

In the equation (1), $\tau$ denotes shear force, $\tau_0$ denotes yield value, $E_{ta}$ denotes plastic viscosity, and D denotes shear velocity.

The Casson yield value is measured, for example, by High-Shear Viscometer (AR2000, manufactured by TA Instruments).

In course of emulsifying and/or dispersing, a mixing ratio of the aqueous phase and the oil phase is not particularly limited and can be appropriately adjusted in accordance with a purpose. It is preferable that the mixed emulsion or suspension forms a oil in water emulsion and/or suspension in which 10% by mass to 90% by mass of the oil phase is dispersed in 90% by mass to 10% by mass of the aqueous phase.

<Aggregation and Association>

The aforementioned aggregating is such that the oil droplets, which are formed by emulsifying and/or dispersing the oil phase in the aqueous phase, are aggregated with other oil droplets locating nearby. As a result of association, the oil droplets locating nearby form a one particle.

The aggregating is performed in a method for producing a toner in which the toner is granulated in an aqueous phase, e.g. a method of producing a toner in which the aforementioned adhesive base material is formed in the form of particles by the conventional methods such as suspension-polymerization, emulsification-polymerization, and dissolution-suspension.

In the case that the oil phase is emulsified and/or dispersed in the aqueous phase by imparting high-shear force, spherical oil droplets are forming due to a difference of surface tension between the oil phase and the aqueous phase. This formation of the spherical oil droplets is occurred not only when the oil phase exhibits Newtonian viscosity, but also when the oil phase exhibits non-Newtonian viscosity as the structural viscosity is destroyed by the imparted high-shear force and thus the oil phase exhibits viscosity similar to that of a Newtonian fluid.

Thereafter, the aggregating is carried out by imparting low-shear force, i.e. force caused by slow stirring, or in a resting state, to thereby yield a toner having a narrow particle size distribution. Namely, even when the oil droplets have a wide particle size distribution, small droplets are aggregated to large droplets, and thus the number of small size particles are decreased and the particle size distribution is narrowed as a whole.

In order to obtain a suitably deformed toner, it is necessary to prevent a flow within each of the oil droplets at the time of aggregating.

Figure 2A:
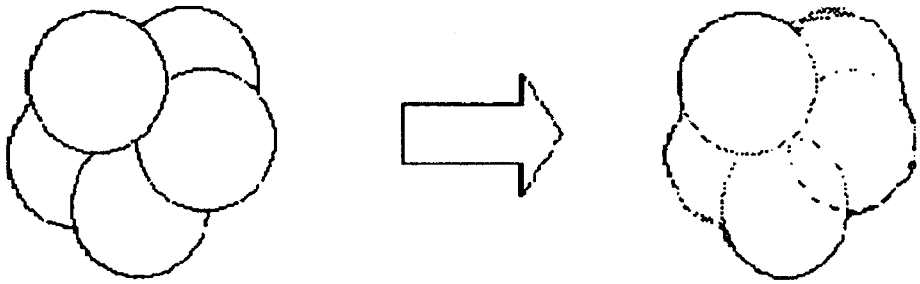
FIG. 2A is a schematic diagram illustrating an example of aggregation and association when oil droplets each having a large diameter exhibit non-Newtonian viscosity.
Figure 2B:
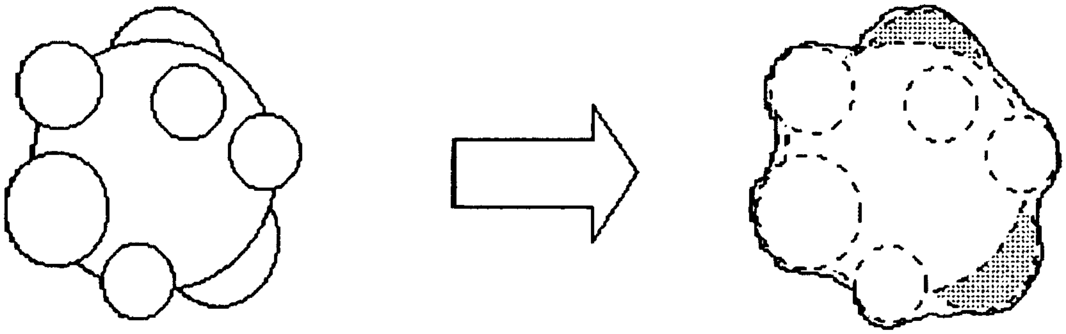
FIG. 2B is a schematic diagram illustrating an example of aggregation and association when oil droplets of small diameters exhibit non-Newtonian viscosity.

In course of aggregating, the oil droplets have non-Newtonian viscosity as the oil droplets are released from high-shear force, and the oil droplets start aggregating each other by the recovered structural viscosity, or while recovering the structural viscosity. At this point, since the aggregated oil droplets have the structural viscosity, each oil droplet in the aggregated oil droplet does not flow therein, keeps the shape thereof, and thus form a deformed particle. As shown in FIG. 2A, for example, relatively large droplets forming one particle respectively maintain the shape thereof after aggregating. As shown in FIG. 2B, moreover, relatively small droplets maintain their shapes while aggregating and associating on one relatively large droplet.

Accordingly, regardless the size of the oil droplets, the oil droplets maintain their shapes while aggregating and associating on other droplet at interference thereof, and form a deformed toner.

<Removal of the Organic Solvent>

The aforementioned removing the organic solvent is to remove the organic solvent from the oil droplets formed by emulsifying and/or dispersing the oil phase in the aqueous phase.

The removal of the solvent is performed, for example, within the process of the conventional dissolution-suspension method or the preferable embodiment of the method for producing a toner of the present invention.

In order to obtain a suitably deformed toner (toner particles), it is necessary to prevent a flow within each of the oil droplets at the time of removing the organic solvent.

Figure 3:
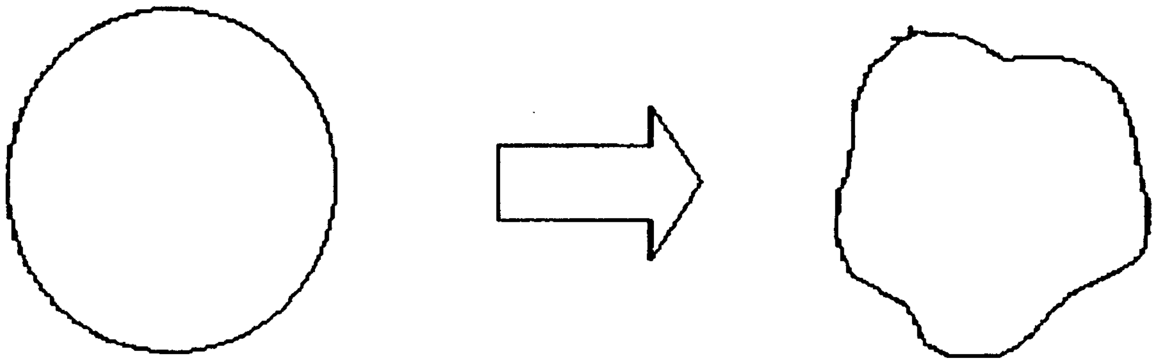
FIG. 3 is a schematic diagram illustrating an example of an organic solvent removal when oil droplets exhibit non-Newtonian viscosity.

In the case that the oil droplets have non-Newtonian viscosity and exhibit structural viscosity, the viscosity of the oil droplets temporarily is recovered even after the structural viscosity is destroyed in course of the emulsification and/or dispersion. Even though the structural viscosity cannot be recovered at the time of aggregating and thus relatively large and spherical oil droplets are formed, as shown in FIG. 3, deformed particles can be still obtained by removing the solvent while temporarily recovering the structural viscosity. This is because a flow does not occur within each of the oil droplets at the time of removing the organic solvent and the surface area contraction cannot keep up with the constantly occurring volume contraction.

Although the deformed toner is formed as long as the oil droplets exhibit non-Newtonian viscosity at the time of removing the organic solvent, it is preferred that the oil droplets are subjected to aggregation and association, the organic solvent is removed from the associated oil droplets, and the oil droplets exhibit non-Newtonian viscosity at the time of removing the solvent as well as at the time of aggregating. In the case that the oil droplets exhibit non-Newtonian viscosity at the time of both aggregating and removing the solvent, there is provided a toner which has a small particle size, and is more deformed.

The method for removing the organic solvent are: (1) a method in which an emulsion and/or dispersion is gradually heated so as to completely evaporate the organic solvent in the oil droplets; (2) a method in which an emulsified dispersion is sprayed in a dry air, and the water-insoluble organic solvent in the oil droplets is removed to form toner particles as well as completely evaporating the aqueous dispersant; and the like.

Once the organic solvent is removed, toner particles are formed. The toner particles are then subjected washing, drying, and the like. Sequentially, the toner particles are optionally subjected to a classification. The classification is, for example, carried out by cyclone, decanter, or centrifugal separation in the solution. Alternatively, the classification is carried out after the toner particles are obtained as powder by drying.

The thus obtained toner particles are subjected to mixing with particles such as the colorant, the wax, the charge controlling agent, etc., and mechanical impact, thereby preventing the particles such as the wax falling off from the surface of the toner particles.

Examples of the method of imparting mechanical impact are a method in which an impact is imparted by rotating a blade at high speed, and a method in which an impact is imparted by introducing the mixed particles into a high-speed flow and accelerating the speed of the flow so as to make the particles impact with each other or so as to make the composite particles to impact upon an impact board. Examples of a device employed to such method are an angmill (manufactured by Hosokawamicron Corp.), a modified I-type mill (manufactured by Nippon Pneumatic Mfg. Co., Ltd.) to decrease crushing air pressure, a hybridization system (manufactured by Nara Machinery Co., Ltd.), a krypton system (manufactured by Kawasaki Heavy Industries, Ltd.), an automatic mortar, and the like.

The toner (toner particles) preferably has the following average circularity, volume average particle diameter (Dv), a ratio (Dv/Dn) of volume average particle diameter (Dv) to number average particle diameter (Dn), penetration, low-temperature fixing properties, offset non-occurring temperature, thermal characteristics, image density, and the like.

The average circularity is an amount which a circumference of an equivalent circle having the same projected area to the toner particle shape minuses a boundary length of the actual toner particle. The average circularity is preferably 0.900 to 0.980, and more preferably 0.900 to 0.970. It is preferable that the amount of the particles having the average circularity of 0.970 or more is 10% or less with respect to the total amount of the toner.

In the case that the average circularity is more than 0.980, it is liable to cause image smears resulted from cleaning failure to a latent electrostatic image bearing member and a transferring belt in an image-forming system utilizing a cleaning blade. Specifically, in the case of a formation of images having large image area such as photographic images, a toner forming an image remains on a latent electrostatic image bearing member due to paper feed failure or the like, and becomes a residual toner. Such residual toner is accumulated on the latent electrostatic image bearing member and the accumulated residual toner causes background smear on the formed image, or pollutes a charging roller which contact-charges the latent electrostatic image bearing member so that the charging roller is unable to exhibit original charging ability.

The average circularity is measured, for example, by an optical detection zone method in which a suspension containing the toner is passed through an image-detection zone disposed on a plate, the particle images of the toner are optically detected by means of a CCD camera, and the obtained particle images are analyzed. For example, Flow-type particle image analyzer FPIA-2100 (manufactured by Sysmex Corp.) is employed for such method.

Specifically, into a container is poured 100 ml to 150 ml of purified water from which the solid impurities are previously removed, 0.1 ml to 0.5 ml of a surfactant, i.e. alkylbenzene sulfonate, as a dispersant, and 0.1 g to 0.5 g of the toner. The mixture is then mixed to yield dispersion. The thus obtained dispersion is further dispersed for about 1 to 3 minutes by means of an ultrasonic disperser to adjust the concentration of the dispersant to 3,000 to 10,000 per micro liter. The shape and distribution of the toner are measured from the thus obtained dispersion, and the average circularity is obtained from the results of the toner shape and distribution.

The volume average particle diameter (Dv) of the toner is preferably 3 μm to 8 μm, and more preferably 4 μm to 7 μm.

In the case that the volume average particle diameter is less than 3 μm, the toner of two-component developer is liable to fuse onto carrier surfaces as a result of stirring in the developing unit for a long period, and a one-component developer is liable to cause a filming to a developing roller or fusion to a member such as a blade for reducing a thickness of a toner layer formed onto a developing roller.

In the case that the volume average particle diameter is more than 8 μm, an image of high resolution and high quality is rarely obtained, and the mean toner particle diameter is liable to fluctuate when a toner is repeatedly added to the developer to compensate the consumed toner.

The ratio (Dv/Dn) of the volume average particle diameter (Dv) to the number average particle diameter (Dn) is preferably 1.05 to 1.25, and more preferably 1.05 to 1.20, In the case that the ratio is less than 1.05, the toner of a two-component developer is liable to fuse onto carrier surfaces due to stirring in a developing unit for a long-term, thereby degrading a charging ability of the carrier or cleaning properties, and a one-component developer is liable to cause a filming to a developing roller or fusion to a member such as a blade for reducing a thickness of a toner layer formed onto a developing roller. In the case that the ratio is more than 1.25, an image of high resolution and high quality is rarely obtained, and the mean toner particle diameter is liable to fluctuate when a toner is repeatedly added to the developer to compensate the consumed toner.

In the case that the ratio is in the range of 1.05 to 1.20, the toner excels in heat resistance preservation, low-temperature fixing properties, and hot-offset resistance, and has especially excellent image glossiness when the toner is employed for a full-color photocopier. The two-component developer containing such toner rarely changes in mean particle diameter when a toner is repeatedly added to the developer to compensate the consumed toner, and has an excellent charging ability of the carrier or cleaning properties. The one-component developer of such toner rarely fluctuates in its toner particle when a toner is repeatedly added to the developer to compensate the consumed toner, rarely causes a filming to a developing roller or fusion to a member such as a blade for reducing a thickness of a toner layer formed onto a developing roller, and thus attains high quality images.

The volume average particle diameter and the ratio (Dv/Dn) are measured, for example, by means of a particle size analyzer, MultiSizer II, manufactured by Beckmann Coulter Inc, The penetration is 15 mm or more, and preferably 20 mm to 20 mm in accordance with a penetration test (JIS K2235-1991).

In the case that the penetration is less than 15 mm, it is liable to degrade heat resistance preservation.

The penetration is measured in accordance with JIS K2235-1991. Specifically, the penetration is measure by filling a toner into a 50 ml glass container, leaving the glass container filled with the toner in a thermostat of 50° C. for 20 hours, sequentially cooling the toner to an ambient temperature, and then carrying out a penetration test thereto. Note that, the higher the penetration is, more excellent heat resistance preservation the toner has.

As the low-temperature fixing properties of the toner, the lowest fixing temperature is preferably as low as possible, and the offset non-occurring temperature is preferably as high as possible, in view of realizing both lower fixing temperature and prevention of offset. When the lowest fixing temperature is less than 140° C. and the offset non-occurring temperature is 200° C. or more, both the lower fixing temperature and prevention of offset are realized.

The lowest fixing temperature is determined as follow. A transfer sheet is set in an image-forming apparatus, a copy test is carried out, the thus obtained fixed image is scrubbed by pads, and the persistence of the image density is measured. The lowest fixing temperature is determined as a temperature at which the persistence of the image density becomes 70% or more.

The offset non-occurring temperature is measured as follow. A transfer sheet is set in an image-forming apparatus, and the image-forming apparatus is adjusted so as to develop a solid image in each color of yellow, magenta, and cyan, as well as intermediate colors of red, blue, and green, and so as to vary the temperature of a fixing belt. The offset non-occurring temperature is determined as the highest fixing temperature at which offset does not occur.

The thermal characteristics are also referred to flow tester characteristics, and are evaluated by softening temperature (Ts), flow-beginning temperature (Tfb), 1/2 method softening temperature (T1/2), and the like.

These thermal characteristics are measured by an appropriately selected method. For example, the thermal characteristics are obtained from a flow carve measured by means of a capillary flow tester CFT500 manufactured by Shimadzu Corp.

The softening temperature (Ts) is not particularly limited, and can be appropriately adjusted in accordance with a purpose. It is preferably 30° C. or more, and more preferably 50° C. to 90° C. In the case that the softening temperature (Ts) is less than 30° C., at least one of the heat resistance preservation or low-temperature preservation may be degraded.

The flow-beginning temperature (Tfb) is not particularly limited, and can be appropriately adjusted in accordance with a purpose. It is preferably 60° C. or more, and more preferably 80° C. to 120° C. In the case that the flow-beginning temperature (Tfb) is less than 60° C., at least one of the heat resistance preservation or low-temperature preservation may be degraded.

The 1/2 method softening temperature (T1/2) is not particularly limited, and can be appropriately adjusted in accordance with a purpose. It is preferably 90° C. or more, and more preferably 100° C. to 170° C. In the case that the 1/2 method softening temperature (T1/2) is less than 90° C., at least one of the heat resistance preservation or low-temperature preservation may be degraded.

The glass transition temperature of the toner is not particularly limited, and can be appropriately adjusted in accordance with a purpose. It is preferably 40° C. to 70° C., and more preferably 45° C. to 65° C. In the case that the glass transition temperature is lower than 40° C., the heat resistance preservation of the toner is liable to degrade. In the case that the glass transition temperature is higher than 70° C., the low-temperature fixing properties are liable to be insufficient.

The glass transition temperature of the toner is measured, for example, by means of a differential scanning calorimetry (DSC-60, manufactured by Shimadzu Corp.).

The acid value of the toner is preferably 0.5 KOH mg/g to 40.0 KOH mg/g, and more preferably 3.0 KOH mg/g to 35.0 KOH mg/g. By imparting the acid value to the toner, the toner is generally liable to be negatively chargeable.

The image density is determined as a density value measured by means of a spectrometer (SpectroDensitometer 938, manufactured by X-Rite), and is preferably 1.40 or more, more preferably 1.45 or more, and furthermore preferably 1.50 or more.

In the case that the image density is less than 1.40, the image density is low and thus a high quality image may not be obtained.

The image density is measured as follow. A solid image is formed by using a transfer sheet (Type 6200 manufactured by Ricoh Company, Ltd.), and a tandem-type color photocopier (Imagio Neo 450, manufactured by Ricoh Company, Ltd.) The photocopier was adjusted so that 1.00±0.1 mg/cm$^2$ of toner is transferred onto the sheet, and the transferred image is fixed by the fixing roller having a surface temperature of 160±2° C. The thus obtained solid image is subjected to a measurement of glossiness by means of a spectrometer (SpectroDensitometer 938, manufactured by X-Rite), and an average value of measurements at arbitrary selected tree points in the solid image is calculated.

The coloration of the toner is not particularly limited, and can be appropriately selected in accordance with a purpose. For example, the coloration is at least one selected from a black toner, a cyan toner, a magenta toner, and a yellow toner. Each color toner is obtained by appropriately selecting the colorant to be contained therein. It is preferred that the toner is a color toner.

The first embodiment of method for producing particles of the present invention comprises: emulsifying and/or dispersing the oil phase in the aqueous phase so as to form oil droplets; and aggregating the oil droplets so as to associate each other, wherein the oil droplets exhibit non-Newtonian viscosity at the time of aggregating. As a result, a flow does not occur within each of the oil droplets even when the oil droplets are aggregated to each other at the time of aggregating, and thus suitably deformed particles are formed.

The second embodiment of method for producing particles of the present invention comprises: emulsifying and/or dispersing the oil phase containing the organic solvent in the aqueous phase so as to form oil droplets; and removing the organic solvent from the oil droplets, wherein the oil droplets exhibit non-Newtonian viscosity at the time of removing the solvent. As a result, a flow does not occur within each of the oil droplets as the oil droplets exhibit non-Newtonian viscosity at the time of aggregating, the surface area contraction cannot keep up with the constantly occurring the volume contraction, and thus suitably deformed particles are formed.

Accordingly, small and deformed particles are efficiently produced by the method of the present invention.

The particles of the present invention is suitably employed for electrophotography, latent electrostatic recording method, latent electrostatic printing method and the like, provided that the toner material is used as a material to form the particles, as the particles of the present invention is small in size and deformed.

The first embodiment of method for producing a toner of the present invention comprises: emulsifying and/or dispersing the oil phase in the aqueous phase so as to form oil droplets; and aggregating the oil droplets so as to associate each other, wherein the oil droplets exhibit non-Newtonian viscosity at the time of aggregating. As a result, a flow does not occur within each of the oil droplets even when the oil droplets are aggregated and associated to each other at the time of aggregating, and thus suitably deformed toner particles are formed.

The second embodiment of method for producing a toner of the present invention comprises: emulsifying and/or dispersing the oil phase containing the organic solvent in the aqueous phase so as to form oil droplets; and removing the organic solvent from the oil droplets, wherein the oil droplets exhibit non-Newtonian viscosity at the time of removing the solvent. As a result, a flow does not occur within each of the oil droplets as the oil droplets exhibit non-Newtonian viscosity at the time of aggregating, the surface area contraction cannot keep up with the constantly occurring the volume contraction, and thus suitably deformed toner particles are formed.

The toner of present invention has an excellent cleaning ability and attains high quality images, because of its small particle size and deformation. In the case that the toner of the present invention comprises particles containing the adhesive base material which is formed by reacting the active hydrogen group-containing compound and the polymer capable of reacting with an active hydrogen group-containing compound in the aqueous phase, the toner attains excellent properties such as aggregation resistance, charging properties, flowability, a releasing ability, fixing properties and the like, especially heat-temperature fixing properties.

Accordingly, the toner of the present invention can be suitably employed in various fields, especially for an image formation by the electrophotography. The toner of the present invention is applicable for a toner container, developer, process cartridge, image-forming apparatus, and image-forming method described hereinafter.

(Developer)

The toner of the present invention may be used as or contained in a developer. Such developer further comprises other appropriately selected components such as the aforementioned carrier. The developer is either one-component developer or two-component developer. However, the two-component developer is preferable in view of improved life span when the developer is used with, for example, a high speed printer that complies with improvements in recent information processing speed.

The one-component developer using the toner of the present invention shows little changes in the average toner particle size when the toner is repeatedly supplied after consumption thereof. There is no toner filming on the developing roller or adhered by fusion to the members such as the blade for forming a thin toner layer. The one-component developer provides excellent and stable developing property and images after being used (stirred) for a long period of time of a developing device. The two-component developer using the toner of the present invention shows little changes in the average toner particle size in the developer when the toner is repeatedly supplied after consumption due to developing. Even after a long time-period of stirring in a developing device, the two-component developer provides excellent and stable developing properties.

The aforementioned carrier is not particularly limited and can be appropriately selected in accordance with a purpose. However, the carrier is preferably those having a core material and a resin layer coating the core material.

The aforementioned core material is not particularly limited and can be appropriately selected from the known materials. For example, 50 emu/g to 90 emu/g manganese-strontium (Mn—Sr) materials, manganese-magnesium (Mn—Mg) materials are preferable materials. Highly magnetizable materials such as iron powder (100 emu/g or higher) and magnetite (75 emu/g to 120 emu/g) are preferable in view of ensuring the image density. Weakly magnetizable materials such as copper-zinc (Cu—Zn) materials (30 emu/g to 80 emu/g) is preferable in view of reducing the shock to the photoconductor the toner ears from, which is advantageous for high image quality. These are used individually or in combination of two or more.

The aforementioned core material preferably has a volume average particle size of 10 μm to 150 μm, more preferably 40 to 100 μm.

In the case that the average particle size (volume average particle size ($D_{50}$) is smaller than 10 μm, an increased amount of fine powder is observed in the carrier particle size distribution, and thus magnetization per particle is lowered, which may cause the carrier to fly. In the case that the average particle size is larger than 150 μm, the specific surface area is reduced, which may cause the toner to fly. Therefore, a full color image having many solid parts may not be well reproduced particularly in the solid parts.

The aforementioned material for the resin layer is not particularly limited and can be appropriately selected from known resins in accordance with a purpose. Examples of such material are amino resin, polyvinyl resin, polystyrene resin, halogenated olefin resin, polyester resin, polycarbonate resin, polyethylene resin, polyvinyl fluoride resin, polyvinylidene fluoride resin, polytrifluoroethylene resin, polyhexafluoropropylene resin, copolymer of vinylidene fluoride and an acryl monomer, copolymer of vinylidene fluoride and vinyl fluoride, fluoroterpolymer such as terpolymer of tetrafluoroethylene, vinylidene fluoride and a non-fluoride monomer, silicone resin, and the like. These are used individually or in combination of two or more.

Examples of the aforementioned amino resin are urea-formaldehyde resin, melamine resin, benzoguanamine resin, a urea resin, polyamide resin, epoxy resin, and the like. Examples of the aforementioned polyvinyl resin are acryl resin, polymethylmetacrylate resin, polyacrylonitrile resin, polyvinyl acetate resin, polyvinyl alcohol resin, polyvinyl butyral resin, and the like. Examples of the aforementioned polystyrene resin are polystyrene resin, styrene acryl copolymer resin, and the like. Examples of the aforementioned halogenated olefin resin are polyvinyl chloride, and the like. Examples of the aforementioned polyester resin are polyethyleneterephtalate resin, polybutyleneterephtalate, and the like.

The resin layer contains, for example, conductive powder, if necessary. Examples of the conductive powder include metal powder, carbon black, titanium oxide, tin oxide, zinc oxide, and the like. The conductive power preferably has an average particle size of 1 μm or smaller. In the case that the average particle size is larger than 1 μm, it may difficult to control electronic resistance.

The resin layer is formed, for example, by dissolving the aforementioned silicone resin or the like in a solvent to prepare a coating solution, uniformly applying the coating solution to the surface of the aforementioned core material by a known technique, drying, and baking. Examples of the application technique include immersion, spray, and brushing.

The aforementioned solvent is not particularly limited and can be appropriately selected in accordance with a purpose. Examples of the solvent are toluene, xylene, methyethylketone, methylisobutylketone, cerusolbutylacetate, and the like.

Baking is not particularly restricted and can be performed by external heating or internal heating. For example, a technique using a fixed electric furnace, a flowing electric furnace, a rotary electric furnace, or a burner or a technique using a microwave can be used.

The content of the resin layer in the carrier is preferably 0.01% by mass to 5.0% by mass. In the case that it is less than 0.01% by mass, the resin layer may not be uniformly formed on the surface of the core material. In the case that it is more than 5.0% by mass, the resin layer may become excessively thick and cause the granulation between carriers, thereby uniform carrier particles may not be obtained.

When the aforementioned developer is a two-component developer, the content of the carrier in the two-component developer is not particularly limited and can be appropriately selected in accordance with a purpose. For example, the content is preferably 90% by mass to 98% by mass, and more preferably 93% by mass to 97% by mass.

The developer containing the toner of the present invention has an excellent cleaning ability and reliably forming high quality images.

The developer of the present invention can be preferably used in forming images by known, various electrophotographic techniques such as magnetic one-component developing, non-magnetic one-component developing, and two-component developing. In particular, the developer can be preferably used in the toner container, process cartridge, image-forming apparatus, and the image-forming method of the present invention below.

(Toner Container)

The toner container comprises a container and the toner or the developer of the present invention filled in the container.

The container is not particularly limited and can be appropriately selected from known containers. Preferable examples of the container include one having a toner container body and a cap.

The toner container body is not particularly limited in size, shape, structure, and material and can be appropriately selected in accordance with a purpose. The shape is preferably a cylinder. It is particularly preferable that a spiral ridge is formed onto the inner surface, and hence the content or the toner moves toward the discharging end when rotated and the spiral part partly or entirely serves as a bellows.

The material of the toner container body is not particularly limited and preferably offers dimensional accuracy. For example, resins are preferable. Among these, polyester resin, polyethylene resin, polypropylene resin, polystyrene resin, polyvinyl chloride resin, polyacrylic acid, polycarbonate resin, ABS resin, polyacetal resin are preferable.

The toner container is easy to preserve and ship, is handy, and is preferably used with the process cartridge and image forming apparatus, which are described later, by detachably mounting therein for supplying toner.

(Process Cartridge)

The process cartridge comprises a latent electrostatic image bearing member which is configured to bear a latent electrostatic image thereon, and a developing unit which is configured to develop the latent electrostatic image with a developer to form a visible image. The process cartridge further comprises other units or members, if necessary.

The developing unit has a developer storage for storing the aforementioned toner or developer of the present invention and a developer bearing member which is configured to bear and transfer the toner or developer stored in the developer storage and may further have a layer thickness control member for controlling the thickness of a toner layer formed on the developer bearing member.

The process cartridge can be detachably mounted in a variety of electrophotographic apparatus and preferably detachably mounted in the electrophotographic apparatus of the present invention, which is described later.

(Image-forming Method and Image-forming Apparatus)

The image-forming method of the present invention comprises a latent electrostatic image formation, developing, transferring, and fixing. The image-forming method of the present invention optionally comprises other steps, such as charge removal, cleaning, recycling, and the like.

The image-forming apparatus comprises a latent electrostatic image bearing member, a latent electrostatic image forming unit, a developing unit, a transferring unit, and the fixing unit. The image-forming apparatus optionally comprises other units or members such as a charge removing unit, a cleaning unit, a recycling unit, and a controlling unit.

-Latent Electrostatic Image Formation and Latent Electrostatic Image Forming Unit- The latent electrostatic image formation is a step for forming a latent electrostatic image on a latent electrostatic image bearing member.

Note that, in the present specification, the latent electrostatic image bearing member is also referred to a photoconductive insulator, or a photoconductor.

The latent electrostatic image bearing member is not particularly limited in the material, shape, structure or size thereof, and can be appropriately selected from the conventional members. A suitable example of the shape thereof is a drum shape. Examples of the material thereof are an inorganic photoconductor such as amorphous silicone, or selenium, an organic photoconductor such as polysilane, or phthalopolymethine, and the like. Among these examples, the amorphous silicone is preferable in view of long lifetime.

The latent electrostatic image formation is carried out, for example, by exposing the latent electrostatic image bearing member to imagewise light after uniformly charging the entire surface of the latent electrostatic image bearing member. This is performed by means of the latent electrostatic image forming unit.

The latent electrostatic image forming unit comprises a charging unit which is configured to uniformly charge the surface of the photoconductor, and an exposing unit which is configured to expose the surface of the latent electrostatic image bearing member to imagewise light.

The charging is carried out, for example, by applying voltage to the surface of the photoconductor by means of the charging unit.

The charging unit is not particularly limited, and can be appropriately selected in accordance with a purpose. Examples of the charging unit are the conventional contact-charging unit equipped with a conductive or semiconductive roller, blush, film, or rubber blade, the conventional non-contact-charging unit utilizing corona discharge such as corotron, or scorotoron, and the like.

The exposure is carried out, for example, by exposing the surface of the latent electrostatic image bearing member to imagewise light by means of the exposing unit.

The exposing unit is not particularly limited, provided that a predetermined exposure is performed imagewise on the surface of the charged latent electrostatic image bearing member by the charging unit, and can be appropriately selected in accordance with a purpose. Examples of the irradiating unit are various irradiating units such as an optical copy unit, a rod-lens-eye unit, an optical laser unit, an optical liquid crystal shatter unit, and the like In the present invention, a backlight system may be applied for the exposure, in which exposure is carried out imagewise from the back side of the latent electrostatic image bearing member.

-Developing and Developing Unit-

The developing is a step of developing the latent electrostatic image with the toner to form a visible image (toner image).

The developing is performed, for example, by developing the latent electrostatic image with the toner or developer of the present invention by means of the developing unit.

The developing unit is not particularly limited, provided that developing is carried out with the toner or developer of the present invention, and can be appropriately selected in accordance with a purpose. A suitable example of the developing unit is a developing unit which contains the toner or developer therein and capable of directly or indirectly applying the toner to the latent electrostatic image. It is preferred that such developing unit is equipped with the aforementioned toner container.

The developing unit may is of dry developing or wet developing, and for mono-color or a developing unit for multicolor. A suitable example of the developing unit is a developing unit comprising a stirring unit which stirs the toner to impart frictional electrification, and a magnet roller which is rotatebly mounted.

Within the developing unit, the toner and carrier are mixed and stirred, and the toner is charged at the time of friction with the carrier, the rotatable magnetic roller bears the charged toner on the surface thereof to form a magnetic blush. Since the magnet roller is disposed adjacent to the photoconductor, a part of the toner consisting of the magnetic blush, which is formed on the surface of the magnetic roller, is electrically attracted and transferred to the surface of the photoconductor. As a result, the latent electrostatic image is developed by the toner, and the visible image (toner image) of the toner is formed on the photoconductor.

The developer contained in the developing unit is a developer comprising the aforementioned toner. The developer is either one-component developer or two-component developer.

-Transferring and Transferring Unit-

The transferring is a step of transferring the visible image onto a recording medium. The preferably embodiment of the transfer is such that a visible image is primary transferred to an intermediate transferring member, the visible image transferred on the intermediate transferring member is secondary transferred to a recording member. The more preferably embodiment of the transfer is such that the toner is of two or more color, or preferably full-color toner, and the transferring contains a primary transfer wherein a visible image is transferred to the intermediate transferring member to form a composite transferred image, and a secondary transfer wherein the composite transferred image is transferred onto a recording member.

The transfer is carried out, for example, by charging the visible image on the photoconductor by means of a transfer charging unit. This transfer is performed by means of the transferring unit. The preferable embodiment of the transferring unit is such that a transferring unit comprises a primary transferring unit which is configured to transfer a visible image onto an intermediate transferring member to form a composite transferred image, and a secondary transferring unit which is configured to transfer the composite transferred image onto a recording medium.

The intermediate transferring member is not particularly limited, and can be selected from the conventional transferring members in accordance with a purpose. Examples thereof are a transferring belt, and the like.

The transferring unit (the primary transferring unit and the secondary transferring unit) preferably comprises a transferring element which is configured to charge so as to separate the toner image from the photoconductor and to transfer onto a recording medium. In the image-forming apparatus of the present invention, either one, or plurality of transferring units are disposed.

Examples of the transferring element are a corona transferring element utilizing corona discharge, a transferring belt, a transferring roller, a pressure-transferring roller, an adhesion-transferring element, and the like.

The recording medium is not particularly limited, and can be appropriately selected from the conventional recording mediums (recording paper) in accordance with a purpose.

-Fixing and Fixing Unit-

The fixing is a step of fixing the transferred visible image onto the recording member by means of the fixing unit. The fixing may be performed every time each color of the toner is transferred to the recording medium, or after all colors of the toner are transferred and form a superimposed layer of the toner on the recording medium.

The fixing unit is not particularly limited, and can be appropriately selected in accordance with a purpose. Examples of the fixing unit are heating-pressurizing unit, and the like. The heating-pressurizing unit is preferably a combination of a heating roller and a pressurizing roller, a combination of a heating roller, a pressurizing roller, and an endless belt, and the like.

The heating by means of the heating-pressurizing unit is preferably performed at 80° C. to 200° C.

The conventional optical fixing unit may be used in addition to or instead of the aforementioned fixing and fixing unit, if necessary.

The charge removing is a step of applying a bias to the charged photoconductor so as to remove the charge. This is suitably performed by the charge removing unit.

The charge removing unit is not particularly limited, provided that bias is applied to the charged photoconductor to thereby remove the charge, and can be appropriately selected from the conventional charge removing units in accordance with a purpose. A suitable example thereof is a charge removing lamp.

The cleaning is a step of removing the residual toner on the photoconductor. This is suitably performed by means of the cleaning unit.

The cleaning unit is not particularly limited, provided that the residual toner on the photoconductor is removed, and can be appropriately selected from the conventional cleaners in accordance with a purpose. Examples thereof are a magnetic blush cleaner, a electrostatic brush cleaner, a magnetic roller cleaner, a blade cleaner, a blush cleaner, a wave cleaner, and the like.

The recycling is a step of recycling or recovering the color toner collected by the cleaning to the developing unit. This is suitably performed by means of the recycling unit.

The recycling unit is not particularly limited, and can be appropriately selected from the conventional conveyance systems.

The controlling is a step of controlling each of the aforementioned steps. This is suitably performed by means of the controlling unit.

The controlling unit is not particularly limited, provided that each of the aforementioned units or members is controlled, and can be appropriately selected in accordance with a purpose. Examples thereof are devices such a sequencer, a computer, and the like.

One embodiment of the image-forming method of the present invention by means of the image-forming apparatus of the present invention is explained with reference to FIG. 4.

The image-forming apparatus 100 shown in FIG. 4 comprises a photoconductor drum 10 (referred to a photoconductor 10 hereinafter) as the latent electrostatic image bearing member, a charging roller 20 as the charging unit, an exposure device 30 as the exposing unit, a developing device 40 as the developing unit, an intermediate transferring member 50, a cleaning device 60 as the cleaning unit having a cleaning blade, and a charge removing lamp 70 as the charge removing unit.

The intermediate transferring member 50 is an endless belt, and looped around three rollers 51 which are disposed inside thereof. The intermediate transferring member 50 is configured to rotate in the direction shown with the arrow by means of the rollers 51. One or more of the three rollers 51 also functions as a transfer bias roller which is capable of applying a certain transfer bias (primary bias) to the intermediate transferring member 50. Adjacent to the intermediate transferring member 50, there are disposed a cleaning device 90 having a cleaning blade, and a transferring roller 80 as the transferring unit which is capable of applying a transfer bias so as to transfer (secondary transfer) a developed image (toner image) to a transfer sheet 95 as the recording medium. Moreover, there is disposed a corona charger 58 for applying a charge to the toner image transferred on the intermediate transferring medium 50, beside the intermediate transferring medium 50, and in between the contact region of the photoconductor 10 and the intermediate transferring medium 50 and the contact region of the intermediate transferring medium 50 and the transfer sheet 95 in the rotational direction of the intermediate transferring medium 50.

The developing device 40 comprises a developing belt 41, a black developing unit 45K, yellow developing unit 45Y, magenta developing unit 45M, and cyan developing unit 45C, in which the developing units positioned around the developing belt 41. The black developing unit 45K comprises a developer container 42K, a developer supplying roller 43K, and a developing roller 44K; the yellow developing unit 45Y comprises a developer container 42Y, a developer supplying roller 43Y, and a developing roller 44Y; the magenta developing unit 45M comprises a developer container 42M, a developer supplying roller 43M, and a developing roller 44M; the cyan developing unit 45C comprises a developer container 42C, a developer supplying roller 43C, and a developing roller 44C. In addition, the developing belt 41 is an endless belt which is looped around a plurality of belt rollers so as to rotate. Moreover, the developing belt 41 is configured to contact with the photoconductor 10 at a part thereof.

Figure 4:
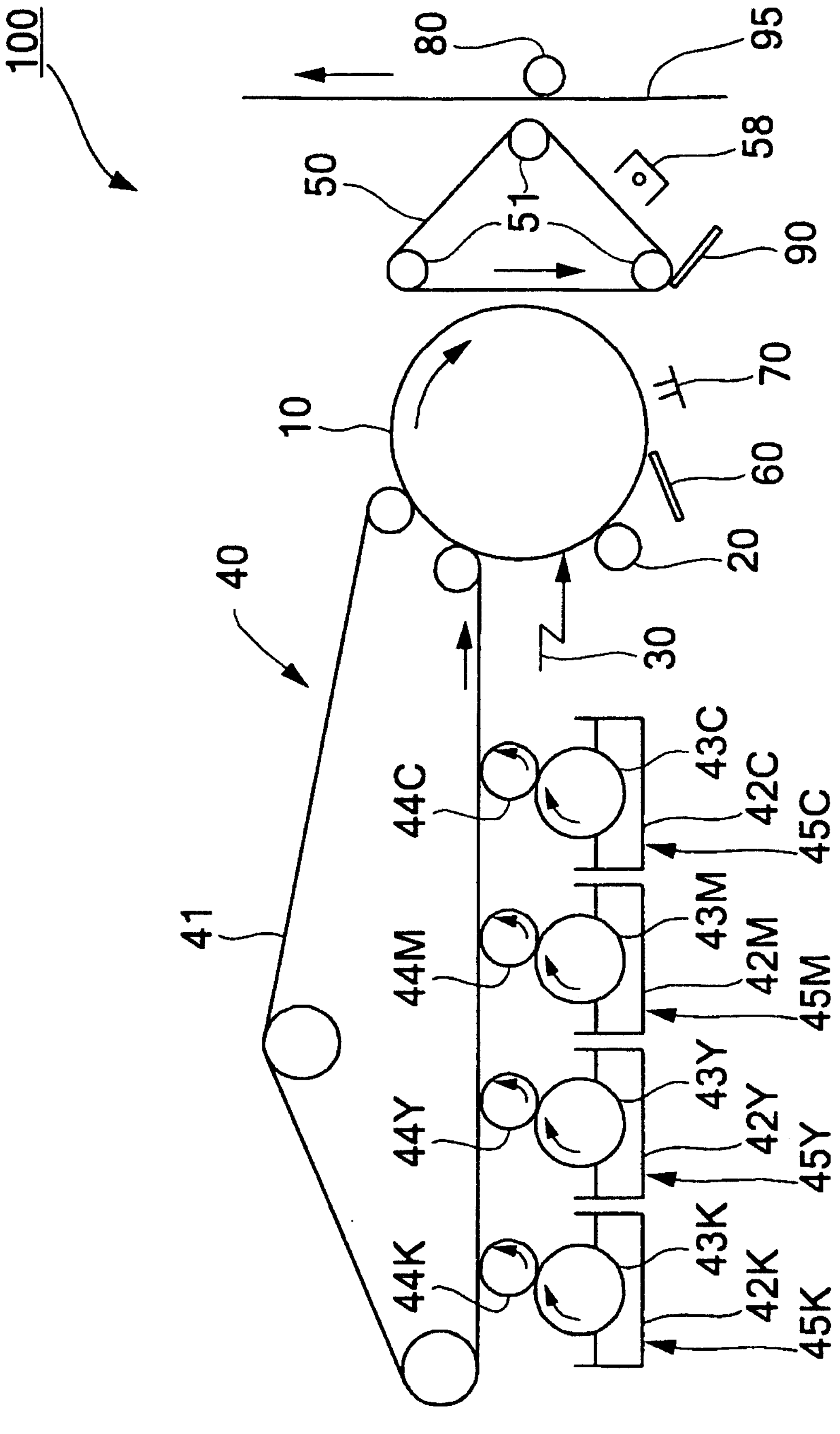
FIG. 4 is a schematic diagram to show an exemplary embodiment of an image-forming method according to the present invention with assistance of an image-forming apparatus.

In the image-forming apparatus 100 shown in FIG. 4, the photoconductor 10 is uniformly charged by the charging roller 20. The exposure device 30 sequentially exposes the photoconductor 10 to imagewise light so as to form a latent electrostatic image. The latent electrostatic image formed on the photoconductor 10 is supplied with a toner from the developing device 40 so as to form a visible image (toner image). The roller 51 applies a bias to the visible image (toner image) so as to transfer (primary transfer) the toner image onto the intermediate transferring medium 50, and further applies a bias to transfer (secondary transfer) the toner image from the intermediate transferring medium 50 to the transfer sheet 95. In this way, the transferred image is formed on the transfer sheet 95. Thereafter, the residual toner on the photoconductor 10 is removed by the cleaning device 60, and the charged photoconductor 10 is diselectrified by the charge removing lamp 70.

Another embodiment of the image-forming method of the present invention by means of the image-forming apparatus of the present invention is explained with reference to FIG. 5.

Figure 5:
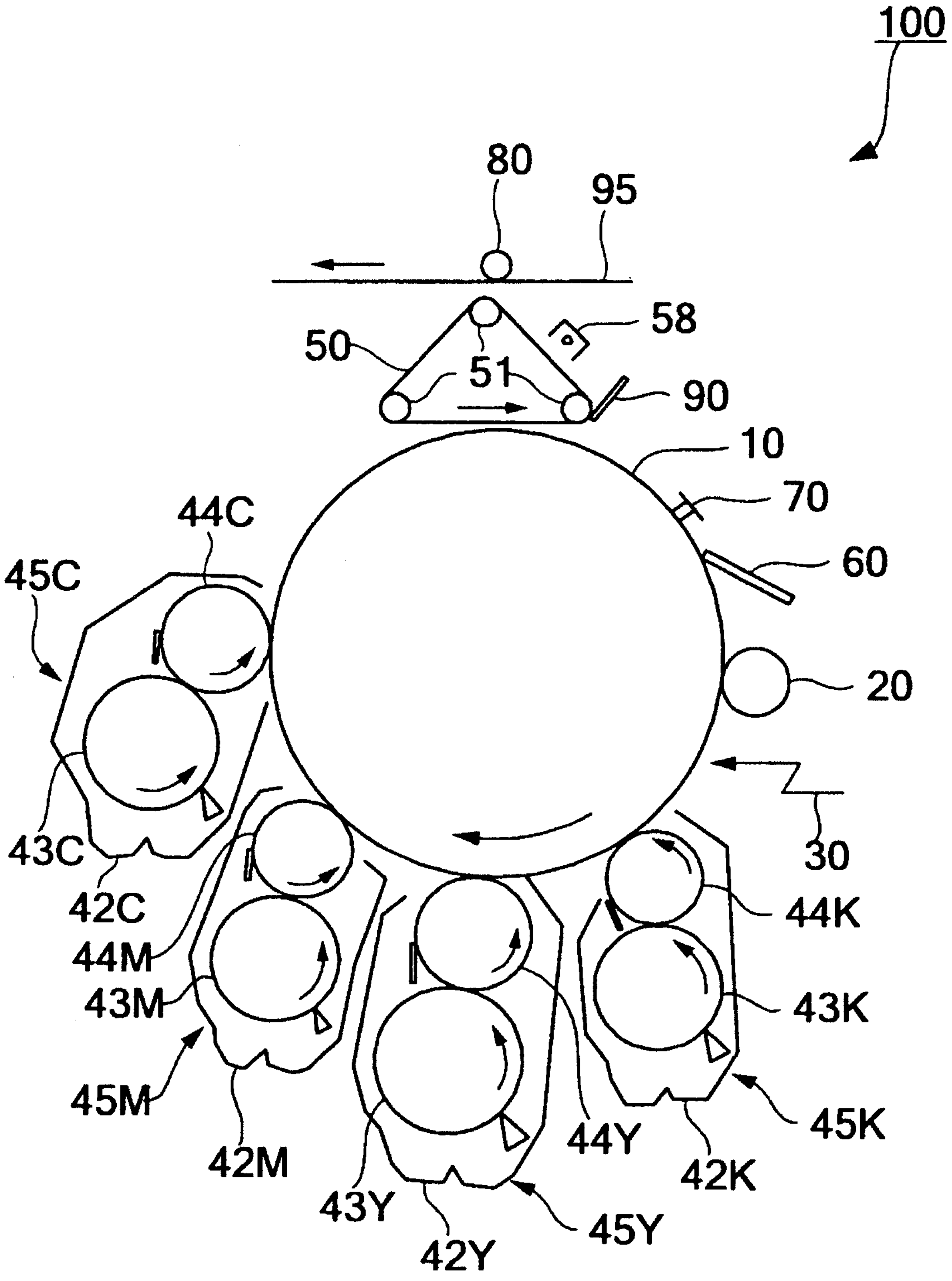
FIG. 5 is a schematic diagram to show another exemplary embodiment of an image-forming method according to the present invention with assistance of an image-forming apparatus.

The image-forming apparatus 100 shown in FIG. 5 has the identical configurations and functions to the image-forming apparatus 100 shown in FIG. 4, provided that the image-forming apparatus 100 does not comprise a developing belt 41, and the black developing unit 45K, the yellow developing unit 45Y, the magenta developing unit 45M, and the cyan developing unit 45C are disposed around the photoconductor 10 so as to face to each other. Note that, the reference numbers of FIG. 5 denote the same members or units to the ones in FIG. 4, if the numbers are identical.

Another embodiment of the image-forming method of the present invention by means of the image-forming apparatus of the present invention is explained with reference to FIG. 6.

Figure 6:
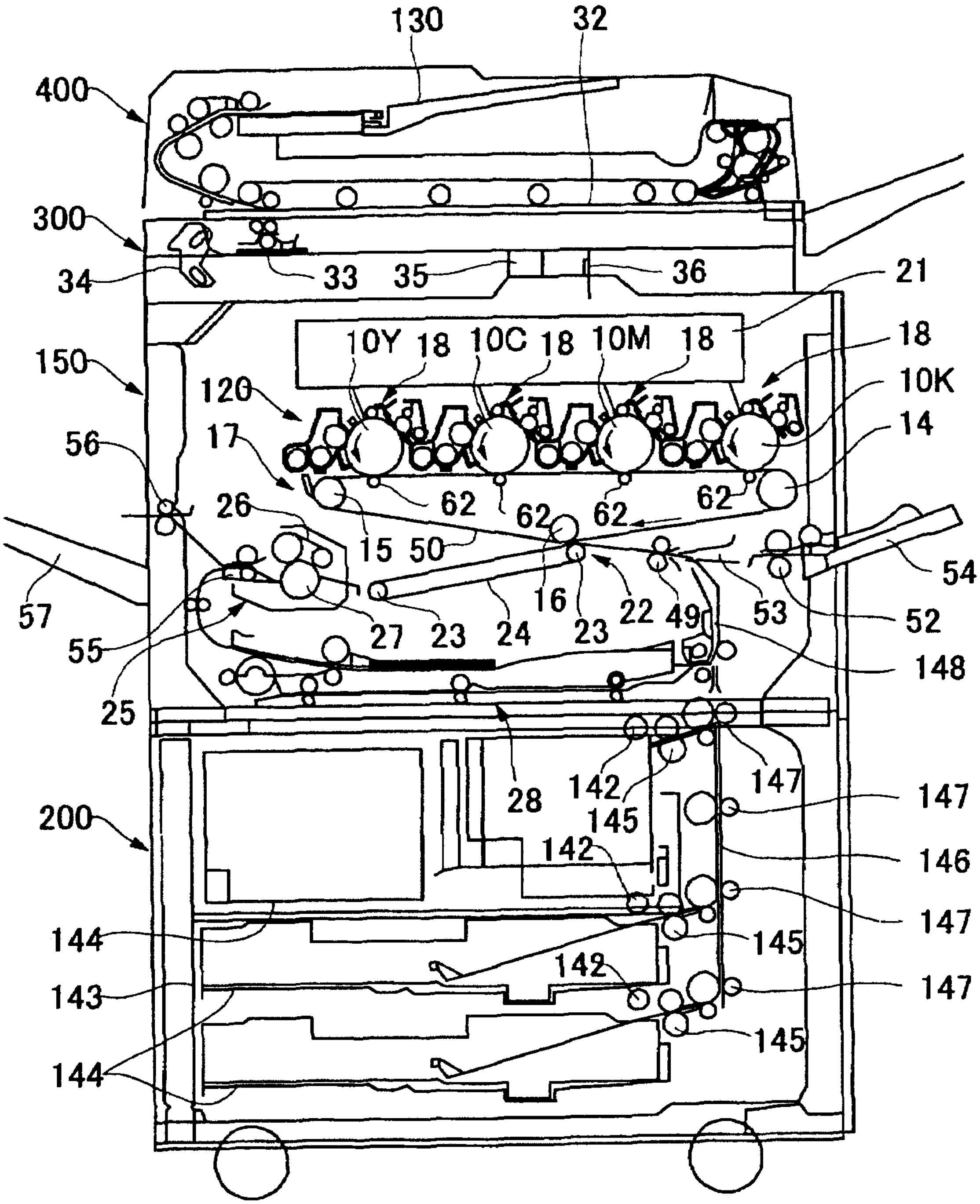
FIG. 6 is a schematic diagram to show an exemplary embodiment of an image-forming method according to the present invention with assistance of an image-forming apparatus (tandem-type color-image-forming apparatus).

The tandem image-forming apparatus 100 shown in FIG. 6 is a tandem color-image-forming apparatus. The tandem image-forming apparatus 100 comprises a copying machine main body 150, a feeder table 200, a scanner 300, and an automatic document feeder (ADF) 400. The copying machine main body 150 contains an endless-belt intermediate transferring member 50.

The intermediate transferring member 50 shown in FIG. 6 is looped around support rollers 514, 515 and 516 and is configured to rotate in a clockwise direction in FIG. 6.

There is disposed a cleaning device 17 for the intermediate transferring member adjacent to the support roller 15. The cleaning device 17 for the intermediate transferring member is capable of removing a residual toner on the intermediate transferring member 50 after transferring a toner image.

Above the intermediate transferring member 50 looped around the support rollers 514 and 515, four image-forming devices 18 of yellow, cyan, magenta, and black are arrayed in parallel in a conveyance direction of the intermediate transferring member 50 to thereby constitute a tandem developing unit 120.

There is also disposed an exposing unit 21 adjacent to the tandem developing unit 120. A secondary transferring unit 22 is disposed the opposite side of the intermediate transferring member 50 to where the tandem developing unit 120 is disposed. The secondary transferring unit 22 comprises a secondary transferring belt 24 of an endless belt, which is looped around a pair of rollers 23. The secondary transferring unit 22 is configured so that the transfer sheet conveyed on the secondary transferring belt 24 contacts with the intermediate transferring member 50. Adjacent to the secondary transferring unit 22, there is disposed an image-fixing device 25. The image-fixing device 25 comprises a fixing belt 26 which is an endless belt, and a pressurizing roller 27 which is disposed so as to contact against the fixing belt 26.

In the tandem image-forming apparatus 100, a sheet reverser 28 is disposed adjacent to the secondary transferring unit 22 and the image-fixing device 25. The sheet reverser 28 is configured to reverse a transfer sheet in order to form images on the both sides of the transfer sheet.

Next, full-color image-formation (color copy) is formed by means of the tandem developing unit 120 in the following manner.

Initially, a document is placed on a document platen 130 of the automatic document feeder 400. Alternatively, the automatic document feeder 400 is opened, the document is placed on a contact glass 32 of the scanner 300, and the automatic document feeder 400 is closed to press the document.

At the time of pushing a start switch (not shown), the document placed on the automatic document feeder 400 is transported onto the contact glass 32. In the case that the document is initially placed on the contact glass 32, the scanner 300 is immediately driven to operate a first carriage 33 and a second carriage 34. Light is applied from a light source to the document, and reflected light from the document is further reflected toward the second carriage 34 at the first carriage 33. The reflected light is further reflected by a mirror of the second carriage 34 and passes through an image-forming lens 35 into a read sensor 36 to thereby read the color document (color image). The read color image is interrupted to image information of black, yellow, magenta and cyan.

Figure 7:
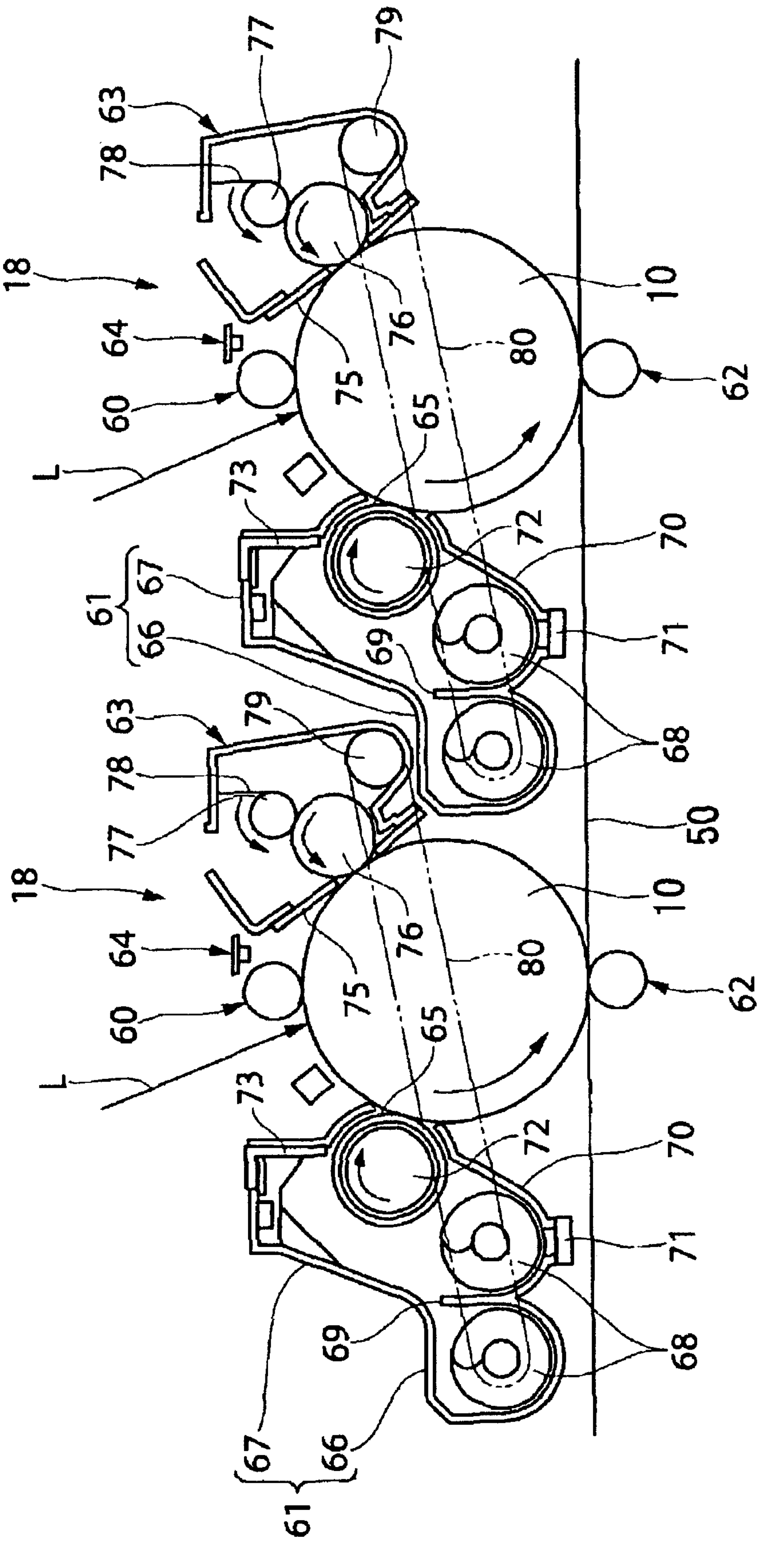
FIG. 7 is a schematic diagram to show an enlarged view of a part of the image-forming apparatus illustrated in FIG. 6.

Each of black, yellow, magenta, and cyan image information is transmitted to respective image-forming units 18 (black image-forming unit, yellow image-forming unit, magenta image-forming unit, and cyan image-forming unit) of the tandem developing device 120, and then toner images of black, yellow, magenta, and cyan are separately formed in each image-forming unit 18. With respect to each of the image-forming units 18 (black image-forming unit, yellow image-forming unit, magenta image-forming unit, and cyan image-forming unit) of the tandem developing device 120, as shown in FIG. 7, there are disposed a photoconductor 10 (a photoconductor for black 10K, a photoconductor for yellow 10Y, a photoconductor for magenta 10M, or a photoconductor for cyan 10C), a charger 60 which uniformly charge the photoconductor, an exposure unit (L) which form a latent electrostatic image corresponding to each color image on the photoconductor, an developing unit 61 which develops the latent electrostatic image with the corresponding color toner (a black toner, a yellow toner, a magenta toner, or a cyan toner) to form a toner image of each color, a transfer charger 62 for transferring the toner image to the intermediate transferring member 50, a photoconductor cleaning device 63, and a charge removing unit 64. Accordingly, each mono-color images (a black image, a yellow image, a magenta image, and a cyan image) are formed based on the corresponding color-image information. The thus obtained black toner image formed on the photoconductor for black 10K, yellow toner image formed on the photoconductor for yellow 10Y, magenta toner image formed on the photoconductor for magenta 10M, and cyan toner image formed on the photoconductor for cyan 10C are sequentially transferred (primary transfer) onto the intermediate transferring member 40 which rotate by means of support rollers 14, 15 and 16. These toner images are superimposed on the intermediate transferring member 40 to form a composite color image (color transferred image).

One of feeder rollers 142 of the feeder table 200 is selectively rotated, sheets are ejected from one of multiple feeder cassettes 144 in a paper bank 143 and are separated in a separation roller 145 one by one into a feeder path 146, are transported by a transport roller 147 into a feeder path 148 in the copying machine main body 100 and are bumped against a resist roller 149. Alternatively, one of the feeder rollers 142 is rotated to ejected sheets from a manual-feeding tray 54, and the sheets are separated in a separation roller 52 one by one into a feeder path 53, transported one by one and then bumped against the resist roller 49. Note that, the resist roller 49 is generally earthed, but it may be biased for removing paper dust of the sheets.

The resist roller 49 is rotated synchronously with the movement of the composite color image on the intermediate transferring member 50 to transport the sheet (recording medium) into between the intermediate transferring member 50 and the secondary transferring unit 22, and the composite color image is transferred onto the sheet by action of the secondary transferring unit 22. After transferring the toner image, the residual toner on the intermediate transferring member 50 is cleaned by means of the intermediate cleaning device 17.

The sheet bearing the transferred image is transported by the secondary transferring unit 22 into the image-fixing device 25, is applied with heat and pressure in the image-fixing device 25 to fix the composite color image (transferred image) to the sheet (recording medium).

The sheet (recording medium) is ejected to the side of the pressurizing roller 27. Thereafter, the sheet changes its direction by action of a switch blade 55, is ejected by an ejecting roller 56 and is stacked on an output tray 57. Alternatively, the sheet changes its direction by action of the switch blade 55 into the sheet reverser 28, turns the direction, is transported again to the transfer section, subjected to an image formation on the back surface thereof. The sheet bearing images on both sides thereof is then ejected with assistance of the ejecting roller 56, and is stacked on the output tray 57.

The image-forming method of the present invention and the image-forming apparatus efficiently produce high quality images as the toner of the present invention, which has a small particle size and is suitably deformed, is used.

The examples of the production of the oil phase are presented hereinafter, but these examples do not intend to limit the scope or embodiment of the present invention. Note that all parts and % described hereinafter are mass based, unless mentioned otherwise.

PRODUCTION EXAMPLE 1

-Preparation of Oil Phase-

The oil phase of Production Example 1 was prepared in a manner described below.

--Preparation of Unmodified (Lower Molecular Mass) Polyester--

Into a reactor equipped with a condenser, a stirrer, and a nitrogen gas feed tube were poured 229 parts of ethylene oxide (2 mole) adduct of bisphenol A, 529 parts of propylene oxide (3 mole) adduct of bisphenol A, 208 parts of terephthalic acid, 46 parts of adipic acid, and 2 parts of dibutyltin oxide. The mixture was reacted at 230° C. at normal atmospheric pressure for 8 hours and was further reacted at a reduced pressure of 10 mmHg to 15 mmHg for 5 hours. Thereafter, the reaction mixture was further reacted with 44 parts of trimellitic anhydride at 180° C. at normal atmospheric pressure for 2 hours, thereby yielded unmodified polyester. The unmodified polyester had a number-average molecular mass (Mn) of 2,600, a mass-average molecular mass (Mw) of 5,800, a glass transition temperature (Tg) of 45° C., and an acid value of 24 mg KOH/g.

--Preparation of Master Batch--

1,200 parts of water, 540 parts of carbon black (PB-k7: Printex 60, manufactured by Degussa; DBP absorption amount: 114 ml/100 g; pH 7) as a colorant, and 1,200 parts of a polyester resin were mixed by means of Henschel Mixer (manufactured by Mitsui Mining Co.). The mixture was kneaded at 150° C. for 30 minutes by a two-roller mill, cold-rolled, and milled by a pulverizer (manufactured by Hosokawamicron Corp.), thereby yielded a master batch.

--Preparation of Prepolymer--

Into a reactor equipped with a condenser, a stirrer, and a nitrogen gas feed tube were poured 682 parts of ethylene oxide (2 mole) adduct of bisphenol A, 81 parts of a propylene oxide (2 mole) adduct of bisphenol A, 283 parts of terephthalic acid, 22 parts of trimellitic anhydride, and 2 parts of dibutyltin oxide. The mixture was reacted at 230° C. at normal atmospheric pressure for 8 hours, was further reacted under a reduced pressure of 10 mmHg to 15 mmHg for 5 hours, and thereby yielded an intermediate product of polyester. The thus obtained intermediate product had a number-average molecular mass (Mn) of 2,100, a mass-average molecular mass (Mw) of 9,500, a glass transition temperature (Tg) of 55° C., an acid value of 0.5 mg KOH/g, and a hydroxyl value of 51 mg KOH/g.

Then, into a reactor equipped with a condenser, a stirrer, and a nitrogen gas feed tube were poured 410 parts of the previously-obtained intermediate product, 89 parts of isophorone diisocyanate, and 500 parts of ethyl acetate, followed by reaction at 100° C. for 5 hours to yield a prepolymer (polymer capable of reacting with the active hydrogen group-containing compound). The thus obtained prepolymer had a free isocyanate content of 1.74%.

--Synthesis of Ketimine (the Active Hydrogen Group-Containing Compound)--

Into a reactor equipped with a stirring rod and a thermometer were poured 170 parts of isophoronediamine and 75 parts of methylethylketone, followed by reaction at 50° C. for 5 hours to yield a ketimine compound (the active hydrogen group-containing compound). The thus obtained ketimine compound (the active hydrogen group-containing compound) had an amine value of 418 mg KOH/g.

Into a reactor were poured 300 parts of the unmodified polyester, 90 parts of carnauba wax, 10 parts of rice wax, and 1,000 parts of ethyl acetate. The mixture was stirred, heated up to 79° C., and dissolved. Sequentially, the dissolved mixture was quenched down to 4° C. Thereafter, the mixture was dispersed using a bead mill (Ultravisco-Mill, by Aimex Co.) at a liquid feeding speed of 1 kg/hr, a disc rotation speed of 6 m/sec, using zirconia beads 0.5 mm in diameter filled 80% by volume. The dispersing procedure was repeated three times to thereby obtain wax dispersion having a volume average particle diameter of 0.6 μm. The wax dispersion was further mixed and dispersed with 500 parts of the master batch and 640 parts of 70% ethyl acetate solution of the unmodified polyester for 10 hours under the above conditions except that the dispersion procedure was repeated five times. The dispersion was added with ethyl acetate to thereby yield a material solution having a solid content of 50% as determined by heating to 130° C. for 30 minutes.

Into a reactor were poured 73.2 parts of the material solution, 6.6 parts of the prepolymer, and 0.48 parts of the ketimine compound. The mixture was sufficiently mixed to thereby yield an oil phase.

-Viscosity of Oil Phase-

The thus obtained oil phase was subjected to the measurements of Casson yield value and structural viscosity as described below. The results are shown in Table 1.

<Measurement of Casson Yield Value>

The Casson yield value of the thus obtained oil phase was measured by means of high-shear viscometer, AR2000, manufactured by TA Instruments. The conditions of the measurement were set such that the temperature was 25° C., the thickness of parallel plate was 40 mm and the gap was 1.000 mm, to thereby obtain a flow curve. The Casson yield value was calculated from the flow curve by Casson equation expressed by the following equation (1).

$$\sqrt{\tau}-\sqrt{\tau 0}=\sqrt{E_{ta}\times D} \quad \text{Equation (1)}$$

In the equation (1), $\tau$ denotes shear force, $\tau_0$ denotes yield value, $E_{ta}$ denotes plastic viscosity, and D denotes shear velocity.

It was found that the Casson yield value of the oil phase was 10.5 Pa.

The viscosity of the thus obtained oil phase was measured by means of high-shear viscometer, AR2000, manufactured by TA Instruments. The conditions of the measurement were set to be such that the temperature was 30° C., the thickness of parallel plate was 40 mm and the gap was 0.500 mm. The measurement was performed at the shear force of 0-1,800 l/s for 2 minutes, and sequentially at the shear force of 0-1,800 l/s for 2 minutes, to thereby obtain structural viscosity from a flow curve (hysteresis curve).

It was found that the oil phase exhibited non-Newtonian having structural viscosity, the structural viscosity was thixotropy.

PRODUCTION EXAMPLES 2-4

-Preparation of Oil Phase-

The oil phases of Production Examples 2-4 were prepared by the same manner as in Production Example 1, provided that the carbon black and resin in the master batch was replaced with a pigment and a resin indicated in Table 1 and the solid content of the material solution was changed to a solid content indicated in Table 1. The thus obtained oil phases were subjected to the measurement of Casson yield value and viscosity in the same matter as in Production Example 1. The results were shown in Table 1.

PRODUCTION EXAMPLE 5

-Preparation of Oil Phase-

The oil phase of Production Example 5 was prepared by the same manner as in Production Example 2, provided that the usage amount of the master batch was changed to 25,000 by parts, the solid content of the material solution was changed to 75%. The thus obtained oil phase was subjected to the measurement of Casson yield value and viscosity in the same matter as in Production Example 1. The results were shown in Table 1.

TABLE 1

| Oil Phase | Product 1 | Product 2 | Product 3 | Product 4 | Product 5 |
|---|---|---|---|---|---|
| Pigment (manufacturer) | PB-k7 (Degussa) | PY155 (Clariant) | PR269 (Dai-Nippon) | PB15:3 (Dainichiseika) | (PY155) (Clariant) |
| Resin | polyester | polyester | polyester | polyester | polyester |
| Solid Content (% by mass) | 50 | 53 | 55 | 40 | 75 |
| Casson yield (Pa) | 10.5 | 25.3 | 19.9 | 0.9 | 240 |
| Structural viscosity | thixotropy | thixotropy | thixotropy | thixotropy | thixotropy |

The examples of the present invention are illustrated in details hereinafter, but it not intended to limit the present invention thereto. Note that all parts and % described hereinafter are mass based, unless mentioned otherwise.

EXAMPLE 1

-Preparation of Oil Droplets-

The oil droplets were prepared by using the oil phase of Production Example 1, and then the toner was produced in a manner described hereinafter.

--Preparation of Aqueous Phase--

---Preparation of Particle Dispersion---

Into a reactor equipped with a stirring rod and a thermometer were poured 683 parts of water, 11 parts of sodium salt of sulfuric acid ester of ethylene oxide adduct of methacrylic acid (Eleminol RS-30 manufactured by Sanyo Chemical Industries Co.), 83 parts of styrene, 83 parts of methacrylic acid, 110 parts of butyl acrylate, and 1 part of ammonium persulfate, and the mixture was then stirred at 400 rpm for 15 minutes to yield a white emulsion. The emulsion was heated to 75° C. and was allowed to react for 5 hours. The reaction mixture was further treated with 30 parts of a 1% aqueous solution of ammonium persulfate, was aged at 75° C. for 5 hours, thereby yielded an aqueous dispersion of vinyl resin particles (a copolymer of styrene-methacrylic acid-butyl acrylate-sodium salt of sulfate of methacrylic acid-ethylene oxide adduct), i.e. a fine-particle dispersion. The particles in the thus obtained fine-particle dispersion had a volume-average particle diameter of 105 nm by the laser scattering particle size distribution analyzer (LA-920 manufactured by Horiba, Ltd.). A part of fine-particle dispersion was dried to isolate the resin component. The resin component had a glass transition temperature (Tg) of 59° C. and a mass-average molecular mass (Mw) of 150,000.

An opaque liquid (aqueous phase) was prepared by blending and stirring 990 parts of water, 83 parts of the previously-obtained particle dispersion, 37 parts of 48.3% aqueous solution of sodium dodecyldiphenylether disulfonate (Eleminol MON-7 manufactured by Sanyo Chemical Industries, Ltd.), and 90 parts of ethylacetate.

--Emulsification and Dispersion--

Into a vessel were poured 80.48 parts of the oil phase of Production Example 1, and 120 parts of the aqueous phase, and the mixture was mixed at 13,000 rpm for 1 minute using TK Homo Mixer (by Tokushu Kika Kogyo Co.), thereby yielded an emulsified slurry containing oil droplets.

<Aggregation and Association>

The thus obtained emulsified slurry was slowly stirred at an ambient temperature so as to aggregate and to associate the oil droplets, and this was continued for 1 hour. After allowing to aggregate and to associate for 1 hour, the emulsified slurry (oil droplets) was subjected to the measurements of Casson yield value and structural viscosity.

The results are shown in Table 2.

<Removal of Solvent>

Into a vessel equipped with a stirrer and a thermometer was poured the associated emulsified slurry, and was heated at 30° C. for 1 hour to remove the solvents. The slurry was then aged at 60° C. for 5 hours, to thereby yield dispersed slurry.

-Washing and Drying- 100 parts of the previously-obtained dispersed slurry was filtered under a reduced pressure. Thereafter, the filtered cake was mixed with 300 parts of deionized water at 12,000 rpm for 10 minutes using TK Homo Mixer, and then filtered. This procedure was repeated twice, to thereby yield a final filtered cake.

The thus obtained filtered cake was dried at 45° C. for 48 hours in a circulating air dryer. Thereafter, the dried cake was screened through a mesh of 75 μm opening, to thereby yield toner-base particles of Example 1.

-External-additive Mixing-

To 100 parts of the previously obtained toner-base particles of Example 1 were added and mixed, as external additives, 0.7 parts of hydrophobic silica and 0.3 parts of hydrophobic titanium oxide using HENSCHEL MIXER (manufactured by Mitsui Mining Co.), to thereby yield a toner (toner particles) of Example 1.

The thus obtained toner was subjected to the measurements of volume average particle diameter (Dv), number average particle diameter (Dn), particle distribution (Dv/Dn), and average circularity in a manner as described below. The results are shown in Table 3.

<Toner Particle Diameter>

The volume average particle diameter (Dv) and number average particle diameter (Dn) of the toner were measured by means of a particle size analyzer (MultiSizer II, manufactured by Beckmann Coulter Inc.) with an aperture of 100 μm. The particle size distribution (Dv/Dn) of the toner was calculated therefrom.

It was found that the volume average particle diameter was 5.5 μm, the number average particle diameter was 4.9 μm, and the particle size distribution (Dv/Dn) was 1.12.

The average circularity of the toner was measured by means of a flow-type particle image analyzer (FPIA-100 manufactured by Sysmex Corp.).

Specifically, into a container was poured 100 ml to 150 ml of purified water from which the solid impurities were previously removed, 0.1 ml to 0.5 ml of a surfactant, i.e. alkylbenzene sulfonate, as a dispersant, and 0.1 g to 0.5 g of the toner. The mixture was then mixed to yield dispersion. The thus obtained dispersion was further dispersed for about 1 to 3 minutes by means of a ultrasonic disperser (manufactured by Honda Electrics Co., Ltd.) to adjust the concentration of the dispersant to 3,000 to 10,000 per micro liter. The shape and distribution of the toner were measured from the thus obtained dispersion, and the average circularity was obtained from the results of the toner shape and distribution.

It was found that the average circularity was 0.978.

EXAMPLES 2-5

The toner-base particles of Examples 2-5 were produced, and subjected to external additive mixing, and a toner of Examples 2-5 was produced in the same manner as in Example 1, provided that the oil phase of Production Example 1 was respectively replaced with the oil phase of Production Examples 2-5. The thus obtained toner was subjected to the various measurements in the same manner as in Example 1.

The results are shown in Tables 2-3.

Figure 8:
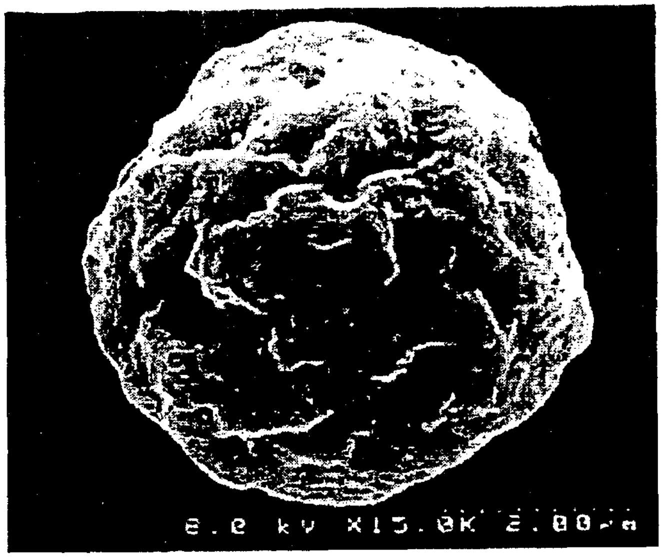
FIG. 8 is a SEM picture to show a shape of the toner obtained in Example 2.

Moreover, the toner of Example 2 was observed under a scanning electron microscopy (SEM), FE-SEM, S-4200, manufactured by Hitachi Co. The SEM picture taken at this observation is shown in FIG. 8. From the observation of SEM picture, it was confirmed that the toner of Example 2 was deformed.

EXAMPLE 6

-Preparation of Oil Droplets-

The oil phase and aqueous phase were prepared, the oil droplets were formed, and the toner was produced in the following manner.

--Preparation of Oil Phase--

---Preparation of Master Batch (MB)---

1,200 parts of water, 540 parts of a pigment (PY155, manufactured by Clariant K.K.), and 1,200 parts of a polyester resin were mixed by means of Henschel Mixer (manufactured by Mitsui Mining Co.). The mixture was kneaded at 150° C. for 30 minutes by a two-roller mill, cold-rolled, and milled by a pulverizer (manufactured by Hosokawamicron Corp.), thereby yielded a master batch.

Into a reactor were poured 90 parts of carnauba wax, 10 parts of rice wax, and 300 parts of toluene. The mixture was stirred, heated up to 80° C., and dissolved. Sequentially, the dissolved mixture was quenched down to 4° C. Thereafter, the mixture was dispersed using a bead mill (Ultravisco-Mill, by Aimex Co.) at a liquid feeding speed of 1 kg/hr, a disc rotation speed of 6 m/sec, using zirconia beads 0.5 mm in diameter filled 80% by volume. The dispersing procedure was repeated five times to thereby obtain wax dispersion having a volume average particle diameter of 0.6 μm. The wax dispersion was further mixed and dispersed with 600 parts of the master batch for 10 hours under the above conditions. Into a container equipped with a stirrer and a thermometer were poured 100 parts of the obtained dispersion, 70 parts of styrene, 5 parts of methacrylic acid, 25 parts of n-butyl acrylate and 5 parts of dialkyl salicylic acid metal compound (charge controlling agent) were uniformly dissolved and dispersed at 10,000 rpm by means of TK Homo Mixer (by Tokushu Kika Kogyo Co.), to thereby yield an oil phase of a polymerable monomer composition.

--Viscosity of Oil Phase--

The thus obtained oil phase was subjected to the measurements of Casson yield value and structural viscosity. It was found that the oil phase has Casson yield value of 1.0 Pa, and structural viscosity. The structural viscosity was thixotropy.

--Preparation of Aqueous Phase--

350 parts of deionized water and 230 parts of $Na_3PO_4$ (0.1 mole) aqueous solution were heated at 60° C., and then were stirred at 12,000 rpm by means of TK Homo Mixer (by Tokushu Kika Kogyo Co.). To the dispersion was gradually added 34 parts of $CaCl_2$ (0.1 mole) aqueous solution to thereby obtain an aqueous phase of an aqueous dispersion containing $Ca_3(PO_4)_2$.

To thus obtained aqueous phase was added the oil phase, and the mixture was stirred at 11,000 rpm, at 60° C., for 3 minutes under N2 atmosphere by means of TK Homo Mixer to thereby yield particles of the polymerable monomer composition (oil droplets).

<Aggregation and Association>

The thus obtained polymerable monomer composition was slowly stirred at an ambient temperature so as to aggregate and to associate the oil droplets, and this was continued for 1 hour. After allowing to aggregate and to associate for 1 hour, the polymerable monomer composition (oil droplets) was subjected to the measurements of Casson yield value and structural viscosity.

The results are shown in Table 3.

The associated polymerable monomer composition was heated at 80° C., and reacted for 10 hours under reduced pressure. After the reaction, non-reacted monomer was removed therefrom. The reacted polymerable monomer composition was then cooled, added with hydrochloric acid to dissolve $Ca_3(PO_4)_2$ therein, filtered, washed with water, and dried to thereby yield yellow toner-base particles.

-External-Additive Mixing-

The previously obtained toner-base particles of Example 6 were subjected to external additive mixing in the same manner as in Example 1, to thereby yield a toner of Example 6.

The thus obtained toner was subjected to the measurements of volume average particle diameter (Dv), number average particle diameter (Dn), particle distribution (Dv/Dn), and average circularity in the same manner in Example 1. The results are shown in Table 3.

TABLE 2

| | Example 1 | Example 2 | Example 3 | Example 4 |
|---|---|---|---|---|
| Oil Phase | Product 1 | Product 2 | Product 3 | Product 4 |
| Casson yield of oil phase (Pa) | 10.5 | 25.3 | 19.9 | 0.9 |
| Structural viscosity of oil phase | thixotropy | thixotropy | thixotropy | thixotropy |
| Solid content (% by mass) | 50 | 53 | 55 | 40 |
| Casson yield of oil droplets at aggregating (Pa) | 21 | 110 | 85 | 20 |
| Viscosity of oil droplets at aggregating (Pa) | thixotropy | thixotropy | thixotropy | thixotropy |
| Average circularity | 0.978 | 0.965 | 0.973 | 0.974 |
| Dv (μm) | 5.5 | 6.1 | 5.8 | 5.4 |
| Dn (μm) | 4.9 | 5.2 | 5.0 | 4.9 |
| Dv/Dn | 1.12 | 1.17 | 1.16 | 1.10 |

TABLE 3

| | Example 5 | Example 6 |
|---|---|---|
| Oil Phase | Product 5 | — |
| Casson yield of oil phase (Pa) | 240 | 1.0 |
| Structural viscosity of oil phase | thixotropy | thixotropy |
| Solid content (% by mass) | 75 | — |
| Casson yield of oil droplets at aggregating (Pa) | 6500 | 2.311 |
| Viscosity of oil droplets at aggregating (Pa) | thixotropy | thixotropy |
| Average circularity | 0.938 | 0.971 |
| Dv (μm) | 7.8 | 7.5 |
| Dn (μm) | 6.4 | 6.0 |
| Dv/Dn | 1.22 | 1.25 |

EXAMPLES 7-11

The toner of Examples 7-11 was produced in the same manner of Example 1-5, respectively, provided that after aggregating for 1 hour, stirring was carried out for another 1 hour in the same conditions so as to recover the structural viscosity of the oil droplets, and then the organic solvent was removed from the oil droplets. The thus obtained toners were subjected to the various measurements in the same manner as in Example 1.

The results are shown in Tables 4 and 5.

After recovering the structural viscosity of the emulsified slurry (oil droplets), the emulsified slurry was inserted into a cell which was comprised of glass plates so as not to let the organic solvent therein evaporate, and the cell was observed under a microscope. It was confirmed that the oil droplets were non-spherical, i.e. be deformed.

COMPARATIVE EXAMPLE 1

The toner-base particles were produced, and subjected to external additive mixing was produced in the same manner as in Example 5, provided that the solid content was changed to 50%, to thereby yield a toner of Comparative Example 1. The thus obtained toner was subjected to the various measurements in the same manner as in Example 5.

The results are shown in Table 5.

Figure 9:
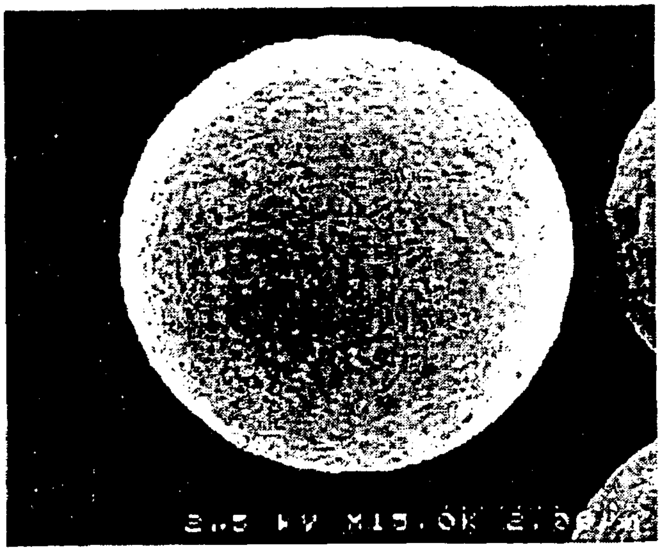
FIG. 9 is a SEM picture to show a shape of the toner obtained in Comparative Example 1.

Moreover, the toner of Comparative Example 1 was observed under a scanning electron microscopy (SEM), FE-SEM, S-4200, manufactured by Hitachi Co. The SEM picture taken at this observation is shown in FIG. 9. From the observation of SEM picture, it was confirmed that the toner of Comparative Example 1 was spherical.

TABLE 4

| | Example 7 | Example 8 | Example 9 | Example 10 |
|---|---|---|---|---|
| Oil Phase | Product 1 | Product 2 | Product 3 | Product 4 |
| Casson yield of oil phase (Pa) | 10.5 | 25.3 | 19.9 | 0.9 |
| Structural viscosity of oil phase | thixotropy | thixotropy | thixotropy | thixotropy |

TABLE 4-continued

| | Example 7 | Example 8 | Example 9 | Example 10 |
|---|---|---|---|---|
| Solid content (% by mass) | 50 | 53 | 55 | 40 |
| Casson yield of oil droplets at aggregating (Pa) | 21 | 110 | 85 | 20 |
| Viscosity of oil droplets at aggregating (Pa) | thixotropy | thixotropy | thixotropy | thixotropy |
| Average circularity | 0.978 | 0.965 | 0.973 | 0.974 |
| Dv (μm) | 5.5 | 6.1 | 5.8 | 5.4 |
| Dn (μm) | 4.9 | 5.2 | 5.0 | 4.9 |
| Dv/Dn | 1.12 | 1.17 | 1.16 | 1.10 |

TABLE 5

| | Example 11 | Com. Example 1 |
|---|---|---|
| Casson yield of oil phase (Pa) | 240 | 0.11 |
| Structural viscosity of oil phase | thixotropy | Newtonian |
| Solid content (% by mass) | 75 | 50 |
| Casson yield of oil droplets at aggregating (Pa) | 6500 | 0.12 |
| Viscosity of oil droplets at aggregating (Pa) | thixotropy | Newtonian |
| Average circularity | 0.938 | 0.988 |
| Dv (μm) | 7.8 | 5.3 |
| Dn (μm) | 6.4 | 4.7 |
| Dv/Dn | 1.22 | 1.13 |

5% of the external additive mixed toner of Examples 1-11 and Comparative Example 1 and 95% of Cu-Zn ferrite carrier having silicone resin coating and an average particle size of 40 μm were mixed in the conventional method to thereby yield a developer of Examples 1-11 and Comparative Example 1.

The thus obtained developers were evaluated in terms of (a) cleaning ability, (b) fixing properties and (c) image density in the following manner.

The results are shown in Table 6.

(a) Cleaning Ability

After cleaning was performed, the residual toner on the photoconductor was removed to a blank paper using Scotch Tape, manufactured by Sumitomo 3M Limited. The removed toner was measured by means of Macbeth Spectrophotometer, RD514, manufactured by GretagMacbeth AG, and the cleaning ability was evaluated based on the following standard.

Evaluation Standard:

Good: a difference with the measurement of the blank paper is 0.01 or less

Poor: a difference with the measurement of the blank paper is more than 0.01

(b) Fixing properties (offset occurring temperature and lowest fixing temperature)

The fixing properties (offset occurring temperature and lowest fixing temperature) were evaluated by using a tandem color electrophotographic device (Imagio Neo 450, manufactured by Ricoh Company, Ltd.), transfer sheets of plain paper (Type 6200, manufactured by Ricoh Company, Ltd.) and thick paper (Copy and Print Paper 135, manufactured by NBC Ricoh Co., Ltd.). Note that, the tandem color electrophotographic apparatus is capable of continuously printing sheets of A4 size at 45 pieces per minute.

<Offset Occurring Temperature>

An image was formed on the plain paper by means of the tandem color electrophotographic device. The device was adjusted so that 0.4±0.05 mg/cm$^2$ of toner would develop a solid image in each of yellow, magenta, cyan, and black, as well as intermediate colors of red, blue, and green. The thus obtained toner image was fixed onto the sheet by varying the temperature of the fixing belt (heating roller). In this way, the lowest fixing temperature at which offset occurred was determined as offset occurring temperature.

<Lowest Fixing Temperature>

A copying test was carried out by using the thick paper, and the tandem color electrophotographic device.

The lowest fixing temperature was determined as a temperature of the fixing roller at which the obtained image maintained an image density of 70% or more after being rubbed by a pat.

(c) Image Density

A solid image was formed by using a tandem color electrophotographic device (Imagio Neo 450, manufactured by Ricoh Company, Ltd.), transfer sheets of plain paper (Type 6200, manufactured by Ricoh Company, Ltd.). The device was adjusted so that 1.00±0.01 mg/cm$^2$ of toner would be transferred onto the sheet, and the image would be fixed by the fixing roller having a surface temperature of 160±2° C.

The thus obtained solid image was subjected to a measurement of image density. The measurement was carried out at by means of a spectrometer (SpectroDensitometer 938, manufactured by X-Rite), and was taken at arbitrary selected five points in the solid image. The image density was determined as an average value of the measurements from the aforementioned five points. Note that a higher value means higher image density, and capability of formation of high density images. When the image density is 1.4 or more, it has a sufficient level of the image density for the practical use.

TABLE 6

| | Cleaning ability | | | Fixing properties | | Image density |
|---|---|---|---|---|---|---|
| | Initial print | Print after $10^4$ pieces | Print after $10^6$ pieces | Lowest fixing temperature (° C.) | Offset occurring temperature (° C.) | Print after $10^6$ pieces |
| Ex. 1 | Good | Good | Good | 140 | 220 or more | 1.51 |
| Ex. 2 | Good | Good | Good | 135 | 220 or more | 1.53 |
| Ex. 3 | Good | Good | Good | 140 | 220 or more | 1.54 |
| Ex. 4 | Good | Good | Good | 140 | 220 or more | 1.5 |
| Ex. 5 | Good | Good | Good | 135 | 220 or more | 1.53 |
| Ex. 6 | Good | Good | Good | 140 | 220 or more | 1.52 |
| Ex. 7 | Good | Good | Good | 140 | 220 or more | 1.51 |
| Ex. 8 | Good | Good | Good | 145 | 220 or more | 1.49 |
| Ex. 9 | Good | Good | Good | 135 | 220 or more | 1.48 |
| Ex. 10 | Good | Good | Good | 140 | 220 or more | 1.51 |
| Ex. 11 | Good | Good | Good | 135 | 220 or more | 1.53 |
| Com. 1 | Poor | Poor | Poor | 140 | 220 or more | 1.37 |

From the results shown in Tables 2-6, it was found that the toner having a small particle size and being deformed was obtained in Examples 1-11. Such toner has an excellent cleaning ability, fixing properties, and image density, and attains high quality images.

On the other hand, the toner obtained in Comparative Example 1 had spherical shape and was inferior in the cleaning ability.

What is claimed are:

1. A method for producing a toner, comprising:

emulsifying and dispersing an oil phase in an aqueous phase so as to form oil droplets; and aggregating the oil droplets so as to associate each other, wherein the oil droplets exhibit non-Newtonian viscosity at the time of aggregating.

2. The method for producing a toner according to claim 1, wherein the oil phase comprises an organic solvent, and the method further comprises, after aggregating, removing the organic solvent from the oil droplets so as to form toner particles, and wherein the oil droplets exhibit non-Newtonian viscosity at the time of removing the organic solvent.

3. The method for producing a toner according to claim 1, wherein the non-Newtonian viscosity is structural viscosity.

4. The method for producing a toner according to claim 3, wherein the structural viscosity is thixotropy.

5. The method for producing a toner according to claim 2, wherein the oil droplets at the time of aggregating or removing the organic solvent have Casson yield value of 0.5 Pa to 10,000 Pa at 25° C.

6. The method for producing a toner according to claim 1, wherein the amount of the aqueous phase is 90% by mass to 10% by mass, and the amount of the oil phase is 10% by mass to 90% by mass.

7. The method for producing a toner according to claim 1, wherein each of the droplets comprises a monomer.

8. The method for producing a toner according to claim 1, wherein each of the droplets comprises a polymer.

9. The method for producing a toner according to claim 1, wherein each of the droplets comprises a polymer capable of reacting with an active hydrogen group-containing compound.

10. The method for producing a toner according to claim 9, wherein the polymer capable of reacting with an active hydrogen-group containing compound has a mass average molecular mass Mw of 3,000 to 40,000.

11. The method for producing a toner according to claim 9, wherein the oil phase is prepared by dissolving and dispersing, in an organic solvent, a toner material which comprises an active hydrogen-group containing compound and the polymer capable of reactive with an active hydrogen-group containing compound, and wherein the emulsifying and dispersing the oil phase in the aqueous medium allows the active hydrogen group-containing compound and the polymer capable of reactive with an active hydrogen group-containing compound to react in the aqueous medium so as to form particles each of which comprises an adhesive base material.

12. The method for producing a toner according to claim 2, wherein the toner particles have an average circularity of 0.900 to 0.980.

13. The method for producing a toner according to claim 2, wherein the toner particles have a volume average particle diameter of 3 μm to 8 μm.

14. The method for producing a toner according to claim 2, wherein a ratio of volume average particle diameter of the toner particles to number average particle diameter of the toner particles is 1.05 to 1.25.

15. A method for producing a toner, comprising:

emulsifying and dispersing an oil phase containing an organic solvent in an aqueous phase so as to form oil droplets; and removing the organic solvent from the oil droplets, wherein the oil droplets exhibit non-Newtonian viscosity at the time of removing the organic solvent.

16. An image-forming method comprising:

forming a latent electrostatic image on a latent electrostatic image bearing member;

developing the latent electrostatic image with a toner so as to form a visible image;

transferring the visible image to a recording medium; and fixing the transferred image onto the recording medium, wherein the toner is produced by the method comprising:

emulsifying and dispersing an oil phase in an aqueous phase so as to form oil droplets; and aggregating the oil droplets so as to associate each other, wherein the oil droplets exhibit non-Newtonian viscosity at the time of aggregating and associating.

* * * * *